(12) United States Patent
Nakashima

(10) Patent No.: US 8,159,417 B2
(45) Date of Patent: Apr. 17, 2012

(54) IMAGE DISPLAY DEVICE

(75) Inventor: Kazuhiro Nakashima, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 329 days.

(21) Appl. No.: 12/654,967

(22) Filed: Jan. 11, 2010

(65) Prior Publication Data

US 2010/0177114 A1  Jul. 15, 2010

(30) Foreign Application Priority Data

Jan. 15, 2009  (JP) .................................. 2009-006978

(51) Int. Cl.
*G09G 5/00* (2006.01)
(52) U.S. Cl. .................. 345/8; 345/7; 349/11; 349/13; 359/13
(58) Field of Classification Search .................. 345/7–9; 340/500; 359/13; 349/11, 13–15
See application file for complete search history.

(56) References Cited

U.S. PATENT DOCUMENTS

| | | | |
|---|---|---|---|
| 5,003,300 A * | 3/1991 | Wells ................................ | 345/8 |
| 5,214,413 A * | 5/1993 | Okabayashi et al. ............ | 345/7 |
| 5,739,797 A * | 4/1998 | Karasawa et al. ............... | 345/8 |
| 6,050,717 A | 4/2000 | Kosugi et al. | |
| 6,329,964 B1 | 12/2001 | Tanaka | |
| 6,445,363 B1 | 9/2002 | Urisaka | |
| 7,542,012 B2 * | 6/2009 | Kato et al. ........................ | 345/8 |
| 2006/0119539 A1 * | 6/2006 | Kato et al. ........................ | 345/8 |
| 2009/0243967 A1 | 10/2009 | Kato | |

FOREIGN PATENT DOCUMENTS

| | | |
|---|---|---|
| JP | A-06-308891 | 11/1994 |
| JP | A-2000-235163 | 8/2000 |
| JP | A-2002-268002 | 9/2002 |
| JP | A-2003-076353 | 3/2003 |
| WO | WO 2006/049270 A1 | 5/2006 |
| WO | WO 2008/032448 A1 | 3/2008 |

OTHER PUBLICATIONS

Oct. 17, 2011 Search Report issued in European Patent Application No. 10250055.0.

* cited by examiner

*Primary Examiner* — Jason Mandeville
(74) *Attorney, Agent, or Firm* — Oliff & Berridge, PLC

(57) ABSTRACT

An image display device includes: a display part, a measuring instrument, a determination unit, a detection unit, a decision unit, and a notification processing unit. The display part allows a user to visually recognize a display image by projecting an image light corresponding to the display image on an eye of the user in a state where some ambient light reaches at least either one of eyes of the user. The measuring instrument measures brightness of the ambient light. The determination unit determines brightness of the display image. The detection unit detects the difference between the brightness of the ambient light and the brightness of the display image. The decision unit decides timing of temporarily stopping the use of the display part. The notification processing unit performs notification which prompts the user to stop the use of the display part at the timing.

10 Claims, 23 Drawing Sheets

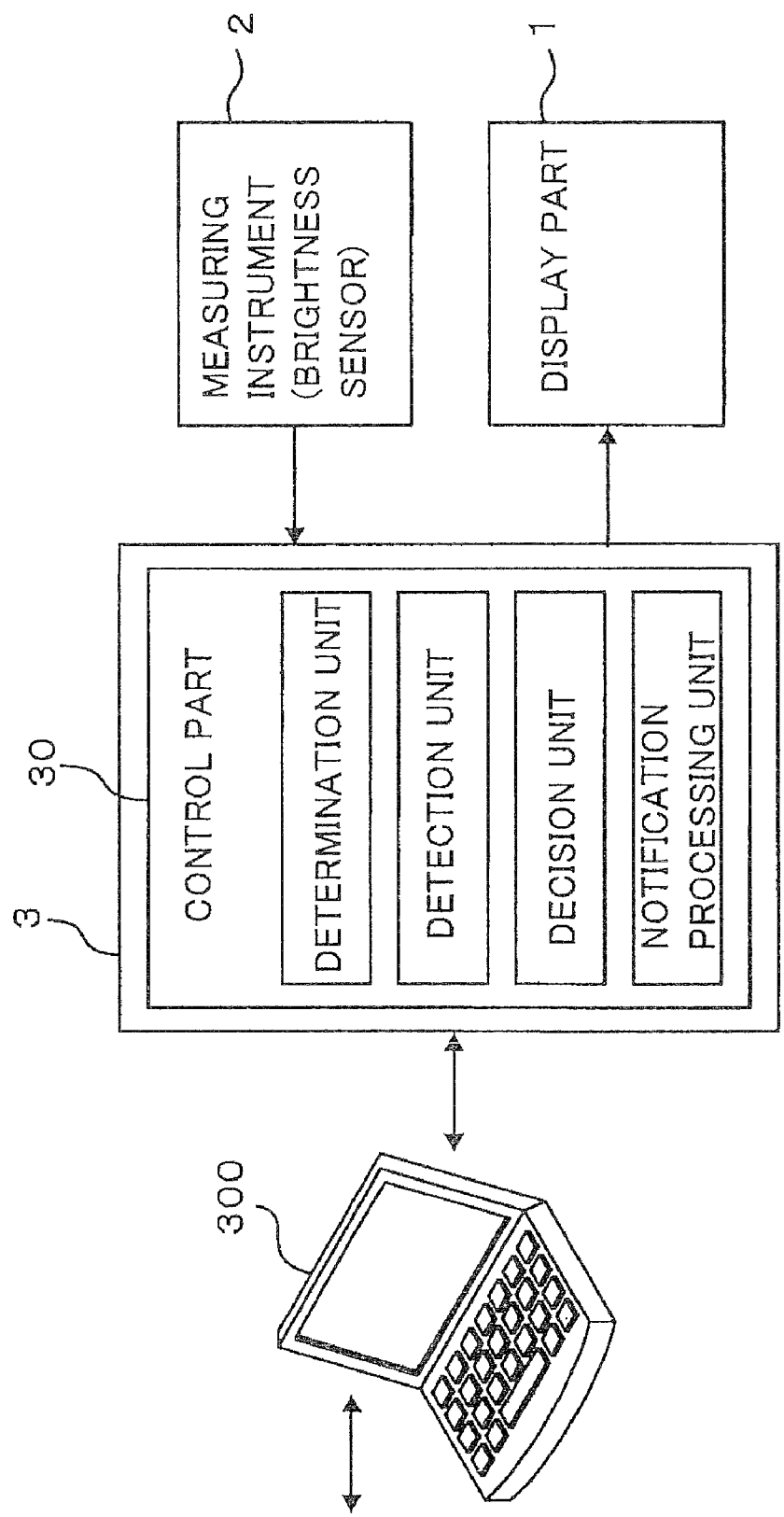

Fig.6

| BRIGHTNESSES OF AMBIENT LIGHT[lx] | BRIGHTNESS OF DISPLAY IMAGE |
|---|---|
| DARK (LESS THAN 300) | DARK (LESS THAN 2 TIMES) |
| | OPTIMUM (2 TO 5 TIMES) |
| | BRIGHT (MORE THAN 5 TIMES) |
| OPTIMUM (300~1500) | DARK (LESS THAN 2 TIMES) |
| | OPTIMUM (2 TO 5 TIMES) |
| | BRIGHT (MORE THAN 5 TIMES) |
| BRIGHT (MORE THAN 1500) | DARK (LESS THAN 2 TIMES) |
| | OPTIMUM (2 TO 5 TIMES) |
| | BRIGHT (MORE THAN 5 TIMES) |

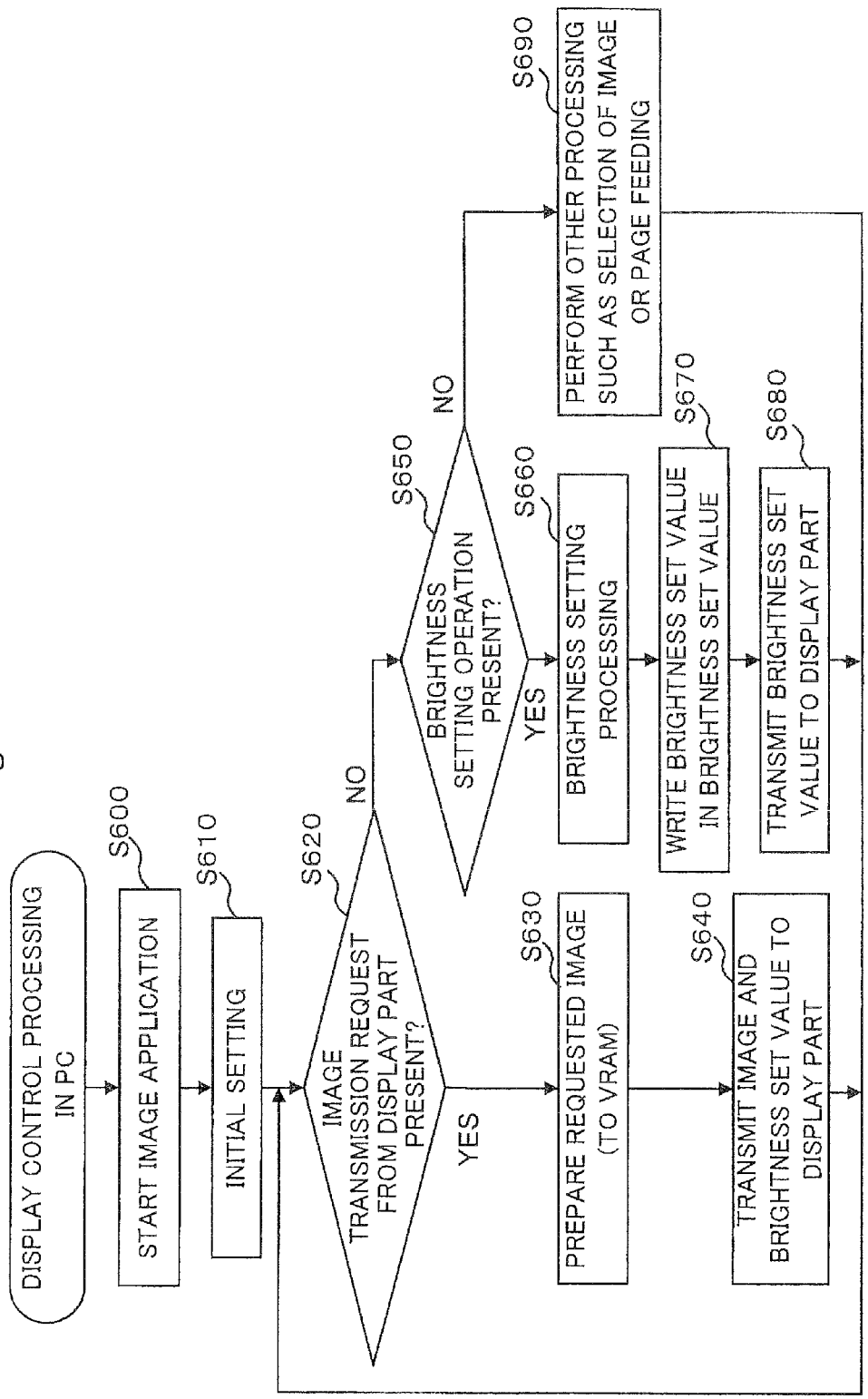

Fig.12A

| BRIGHTNESSES OF AMBIENT LIGHT [Cd/m2] | BRIGHTNESS OF WHITE LEVEL OF DISPLAY IMAGE USING BRIGHTNESSES OF AMBIENT LIGHT AS REFERENCE | COEFFICIENT (/MINUTE) | FATIGUE DETERMINATION CLASS | | |
|---|---|---|---|---|---|
| | | | 1 | 2 | N(≧3) |
| | | | ACCUMULATED VALUE | | |
| LESS THAN 95 | LESS THAN 2 TIMES | 9 | 300 | 250 | 250−50 ×(N−2) |
| | 2 TO 5 TIMES | 7 | | | |
| | MORE THAN 5 TIMES | 9 | | | |
| 95 TO 477 | LESS THAN 2 TIMES | 7 | | | |
| | 2 TO 5 TIMES | 5 | | | |
| | MORE THAN 5 TIMES | 7 | | | |
| MORE THAN 477 | LESS THAN 2 TIMES | 9 | | | |
| | 2 TO 5 TIMES | 7 | | | |
| | MORE THAN 5 TIMES | 9 | | | |

Fig.12B

| BRIGHTNESSES OF AMBIENT LIGHT [lx] | BRIGHTNESS OF WHITE LEVEL OF DISPLAY IMAGE USING BRIGHTNESSES OF AMBIENT LIGHT AS REFERENCE | COEFFICIENT (/MINUTE) | FATIGUE DETERMINATION CLASS | | |
|---|---|---|---|---|---|
| | | | 1 | 2 | N(≥3) |
| | | | ACCUMULATED VALUE | | |
| LESS THAN 300 | LESS THAN 2 TIMES | 9 | 300 | 250 | 250−50 ×(N−2) |
| | 2 TO 5 TIMES | 7 | | | |
| | MORE THAN 5 TIMES | 9 | | | |
| 300 TO 1500 | LESS THAN 2 TIMES | 7 | | | |
| | 2 TO 5 TIMES | 5 | | | |
| | MORE THAN 5 TIMES | 7 | | | |
| MORE THAN 1500 | LESS THAN 2 TIMES | 9 | | | |
| | 2 TO 5 TIMES | 7 | | | |
| | MORE THAN 5 TIMES | 9 | | | |

Fig.12C

| RATIO OF BRIGHTNESSES OF AMBIENT LIGHT WHEN OPTIMUM VALUE OF BRIGHTNESSES OF AMBIENT LIGHT IS SET TO 900[lx] | BRIGHTNESS OF WHITE LEVEL OF DISPLAY IMAGE USING BRIGHTNESSES OF AMBIENT LIGHT AS REFERENCE | COEFFICIENT (/MINUTE) | FATIGUE DETERMINATION CLASS ||||
|---|---|---|---|---|---|
| | | | 1 | 2 | N (≧3) |
| | | | ACCUMULATED VALUE ||| 
| LESS THAN −70% | LESS THAN 2 TIMES | 9 | 300 | 250 | 250−50×(N−2) |
| | 2 TO 5 TIMES | 7 | | | |
| | MORE THAN 5 TIMES | 9 | | | |
| WITHIN ±70% | LESS THAN 2 TIMES | 7 | | | |
| | 2 TO 5 TIMES | 5 | | | |
| | MORE THAN 5 TIMES | 7 | | | |
| MORE THAN +70% | LESS THAN 2 TIMES | 9 | | | |
| | 2 TO 5 TIMES | 7 | | | |
| | MORE THAN 5 TIMES | 9 | | | |

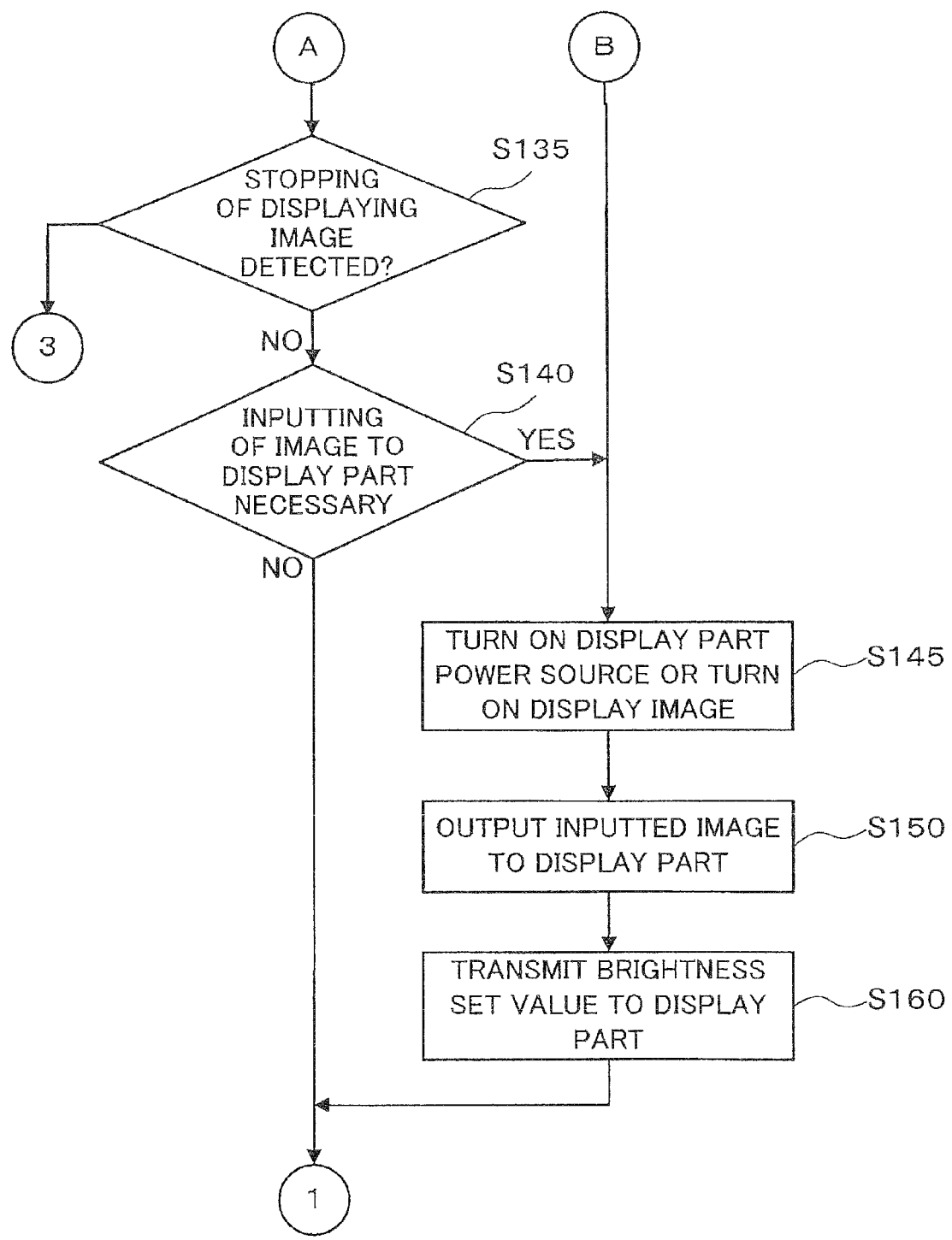

IMAGE DISPLAY DEVICE

CROSS-REFERENCE TO RELATED APPLICATIONS

This application is based on and claims the benefit of priority from Japanese Patent Application No. 2009-006978 filed on Jan. 15, 2009, the entire contents of which are incorporated herein by reference.

BACKGROUND

1. Field

The present invention relates to an image display device.

2. Description of the Related Art

Conventionally, there has been known a head-mount type display (HMD) which includes a display part that projects an image light corresponding to an image to be displayed (hereinafter referred to as "display image") and allows a user to visually recognize the display image, and a mounting portion for mounting the display part on a head of the user. In the HMD, the display part is mounted on the head of the user and hence, so long as the user's eyes are open, the user is always in a viewing state no matter which direction the user orients his position. Accordingly, it is thought that the user is liable to feel eyestrain when he uses the HMD continuously. In view of this situation, there has been proposed an HMD which includes an alarm information generation unit that generates alarm information, a determination unit which monitors a continuous display time from a point of time that a display part starts displaying an image and determines whether or not the continuous display time has reached a predetermined time, and a control unit which performs a control such that alarm information is displayed on the display part when the continuous display time reaches the predetermined time.

SUMMARY

In case of an image display device which is used in a state where some ambient light reaches at least either one of eyes of a user, the degree of eyestrain which the user feels significantly differs depending on the relationship between brightness of the ambient light and brightness of an image which the user visually recognizes. Accordingly, in the above-mentioned related art where the use environment of the HMD is not taken into consideration, the technique for preventing eyestrain is less than optimal. Particularly, in the case of an image display device which is configured to mount a display part thereof on one of eyes of a user, ambient light enters the other eye so long as the eye is open. Accordingly, it is thought that the relationship between the brightness of the ambient light and the brightness of an image which the user visually recognizes largely affects eyestrain of the user. According to the above-mentioned related art, when a user uses the image display device exceeding the predetermined time, alarm information is displayed. Accordingly, depending on the length of the predetermined time, there may be a case where alarm information is displayed in spite of a fact that the user does not feel any fatigue in his eyes. In such a case, the display of the alarm information bothers the user. Also depending on the length of the predetermined time, there may be a case where the user feels eyestrain before a predetermined time set for displaying alarm information has not yet elapsed.

The present invention has been made to overcome these drawbacks, and it is an object of the present invention to provide an image display device which offers stopping-of-use notification to a user at a point of time which is properly determined corresponding to an environment where an image display device is used.

To achieve the above-mentioned object, according to one aspect of the present invention, there is provided an image display device which includes: a display part, a measuring instrument, a determination unit, a detection unit, a decision unit, and a notification processing unit. The display part allows a user to visually recognize a display image by projecting an image light corresponding to the display image on an eye of the user in a state where some ambient light reaches at least either one of eyes of the user. The measuring instrument measures brightness of the ambient light. The determination unit determines brightness of the display image. The detection unit detects the difference between the brightness of the ambient light and the brightness of the display image. The decision unit decides stop timing where the use of the display part by the user is temporarily stopped based on a detection result of the detection unit after the use of the display part is started by the user. The notification processing unit performs stopping-of-use notification which prompts the user to stop the use of the display part at stop timing decided by the decision unit.

BRIEF DESCRIPTION OF THE DRAWINGS

FIG. 4 is a schematic explanatory view of the HMD according to one embodiment of the present invention;

FIG. 6 is an explanatory view showing one example of a table in which brightness of an ambient light and brightness of a display image are associated with each other;

FIG. 11 is an explanatory view showing one example of display control processing using an image application incorporated in a PC;

FIG. 12A is an explanatory view showing a fatigue determination table;

FIG. 12B is an explanatory view showing the fatigue determination table;

FIG. 12C is an explanatory view showing the fatigue determination table;

FIG. 13B is a flowchart showing the main processing of the HMD according to one embodiment of the present invention;

DETAILED DESCRIPTION

Hereinafter, an example of an image display device according to this embodiment is explained in conjunction with drawings. In this embodiment, the explanation is made with respect to a case where the image display device is a retinal scanning head mount display (hereinafter referred to as "HMD") used in a form that the HMD is mounted on a head of a user. The retinal scanning HMD scans an image light generated based on an image signal two-dimensionally and projects the scanned image light to an eye of the user thus forming an image on a retina. However, the present invention is not limited to such an HMD, and the present invention is applicable to any image display device provided that the image display device includes a display part which projects an image light corresponding to a display image in a state where at least some ambient light reaches either one of eyes of the user thus allowing the user to visually recognize the display image.

(Summary of Image Display Device)

Figure 1:
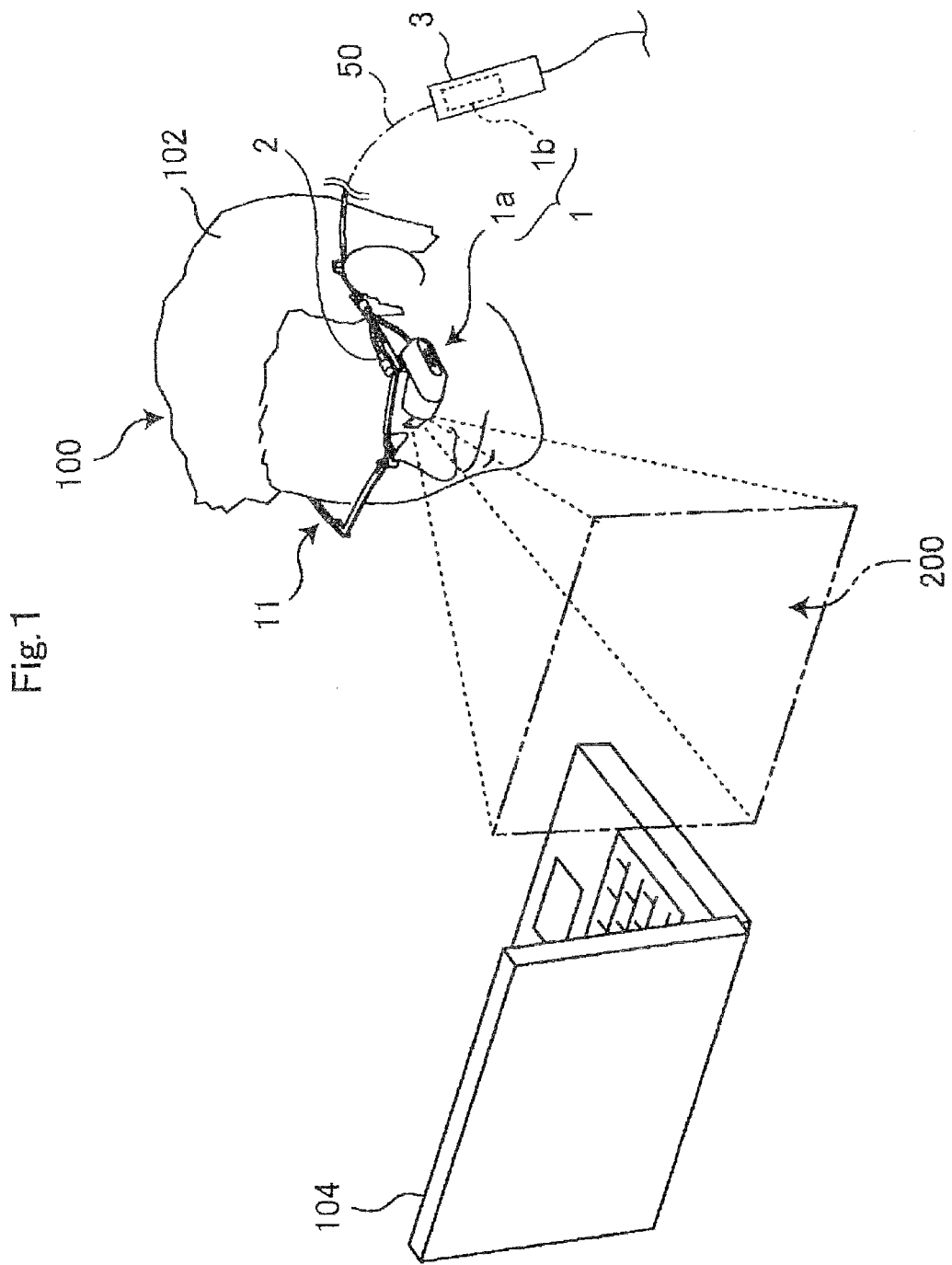
FIG. 1 is an explanatory view showing a use state of an HMD according to one embodiment of the present invention.
Figure 2:
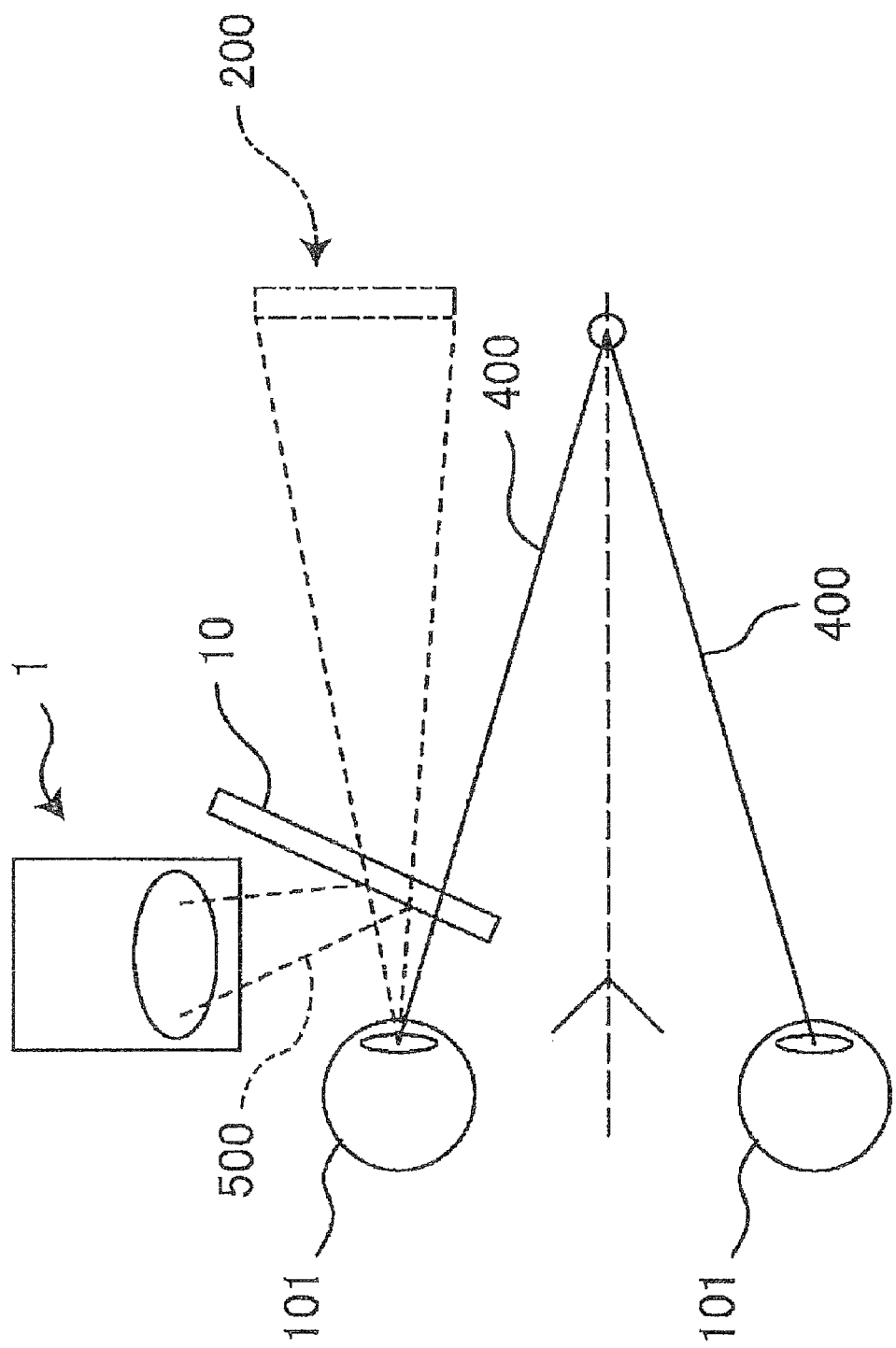
FIG. 2 is an explanatory view showing an advanced state of an image light and an ambient light to an eye of a user who uses the HMD according to one embodiment of the present invention.
Figure 3:
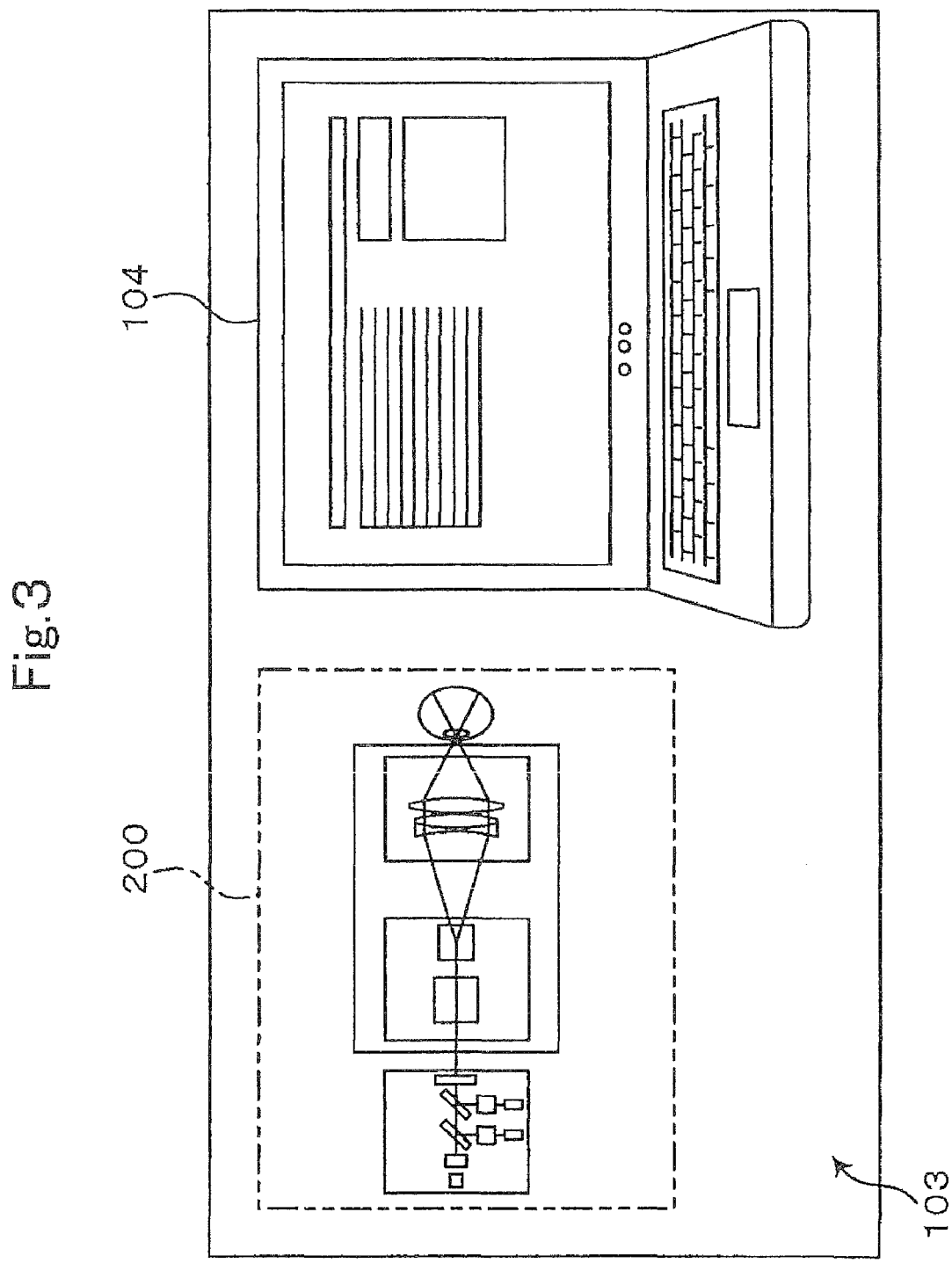
FIG. 3 is an explanatory view showing a sight of the user who uses the HMD according to one embodiment of the present invention.

As shown in FIG. 1 and FIG. 2, the HMD which constitutes one example of the image display device according to this embodiment includes a display part 1. The display part 1 projects an image light corresponding to a display image 200 to an eye 101 of a user 100 in a state where at least some ambient light 400 reaches either one of eyes of the user 100 thus allowing the user 100 to visually recognize the display image 200. The display part 1 is constituted of a projection unit 1a and a light source unit 1b. The projection unit 1a is mounted on a mounting portion 11 which is put on a head 102 of the user 100. The mounting portion 11 is constituted of a support member having an approximately eyeglass shape. The user 100 can wear the mounting portion 11 which mounts the projection unit 1a thereon as if the user 100 wears eyeglasses. An optical source unit 1b is incorporated into a controller 3 which constitutes a separate body from the projection unit 1a. The light source unit 1b is connected with a projection unit 1a through an optical fiber cable 50. As shown in FIG. 2, an ambient light 400 is incident on both eyes of the user 100. Particularly, the ambient light 400 is incident on the left eye 101 on which the projection unit 1a is put on through a half mirror 10, and an image light 500 projected from the projection unit 1a is reflected on the half mirror 10 and is incident on the left eye 101. Accordingly, the display image 200 which the user 100 visually recognizes, as shown in FIG. 3, is displayed in a state where the display image 200 overlaps with scenery of an outside field within a sight 103 of the user 100. In FIG. 1 and FIG. 3, a notebook-type personal computer 104 is shown as an object which exists in the outside field, that is, as the scenery of the outside field. The detailed explanation of the specific constitution of the HMD which includes the half mirror 10 is made later.

Further, as shown in FIG. 4, the HMD also includes a brightness sensor 2 which constitutes the measuring instrument for measuring brightness of an ambient light, a determination unit which determines brightness of the display image 200, and a detection unit which detects the difference between the brightness of the ambient light and the brightness of the display image 200. The HMD includes a decision unit which, after the user 100 starts using of the display part 1, decides stop timing where the use of the display part 1 by the user 100 is temporarily stopped based on a detection result of the detection unit. Further, the HMD includes a notification processing unit which performs stopping-of-use notification which prompts the user to stop the use of the display part 1 at stop timing decided by the decision unit. A control part 30 provided to the controller 3 plays functions of these units. The brightness sensor 2 also includes a photoelectric conversion element such as a photodiode or a phototransistor which can detect a light quantity indicative of brightness around the HMD. This brightness sensor 2 may be mounted on the mounting portion 11 as shown in FIG. 1.

With respect to the above-mentioned HMD, so long as the user 100 opens his eyes 101, no matter which direction the user 100 orients his position, a state where the user 100 observes the display image 200 continues and hence, the user 100 is liable to feel eyestrain. Further, the HMD is a see-through type HMD in which the display image 200 is displayed in a state where the display image 200 overlaps with the scenery of an outside field within the sight 103 of the user 100. That is, the HMD adopts the structure where at least some ambient light reaches either one of eyes 101 of the user 100. Further, visibility of the display image 200 differs depending on the relationship of the brightness of the display image 200 and brightness of a light of the outside field (ambient light). Accordingly, it is desirable to take this point into consideration to prevent the user 100 from feeling eyestrain. That is, it is necessary to adopt the countermeasure corresponding to a use environment when the HMD is continuously used for hours.

Figure 5A:
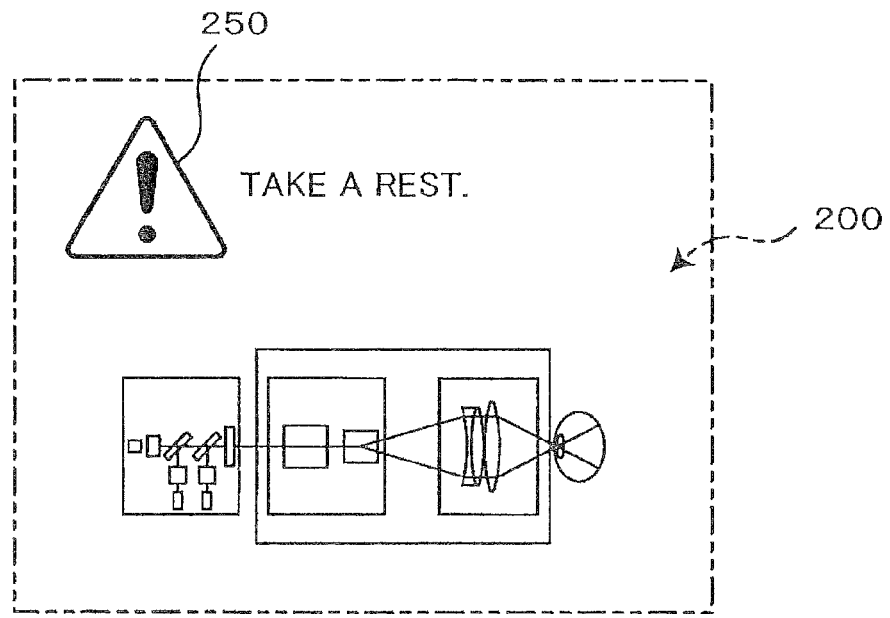
FIG. 5A is an explanatory view of an alarm image.
Figure 5B:
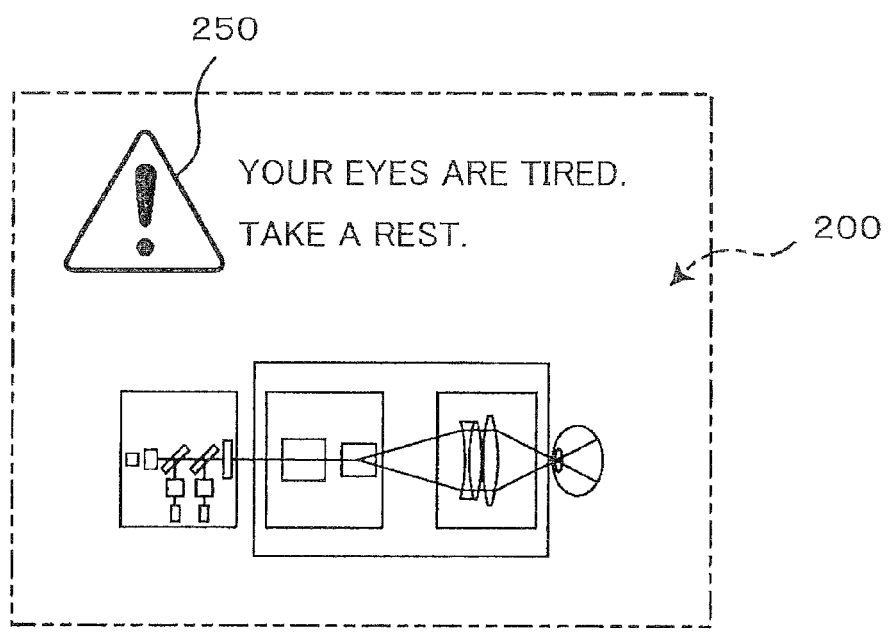
FIG. 5B is an explanatory view of an alarm image.

The HMD of this embodiment detects the difference between the brightness of the ambient light and the brightness of the display image 200. The HMD decides timing where the use of the display part 1 is stopped corresponding to a detection result of the HMD. When the timing where the use of the display part 1 is stopped arrives, as shown in FIG. 5A and FIG. 5B, the HMD makes a notification which prompts the user 100 to stop the use of the display part 1 by displaying an alarm image 250 in the display image 200. Further, when the user 100 continues the use of the display part 1 even after the alarm image 250 is displayed, the HMD can forcibly stop driving of the display part 1 or turn off a power source after a predetermined time elapses.

In this manner, the HMD performs the very detailed stopping-of-use notification corresponding to use environment (the brightness of the ambient light) of the HMD and hence, it is possible to effectively eliminate the adverse effect attributed to eyestrain on a health of the user 100 who uses the HMD.

In the HMD of this embodiment, the brightness of the ambient light compared to the brightness of the display image 200 is set to an average value of ambient light for a predetermined time. This is because that the brightness of the ambient light largely changes corresponding to the direction of a face of the user 100 such as the direction when the face is directed toward a light source or when the face is directed downward depending on the behavior of the user 100. Further, when the face of the user 100 is directed upward to observe the sun or a light source, for example, the degree of brightness is increased as a matter of course. Accordingly, it is desirable not to include the brightness of the ambient light at such a time in setting the above-mentioned average value of the brightness of the ambient light. Further, when brightness of an environment largely changes, for example, when the user 100 enters a bright room from a dark room or the like, it is desirable to adopt, as the average value of the brightness of the ambient light, an average value of the brightness of the ambient light from a point of time that the brightness of the environment largely changes.

In the HMD, to decide stop timing, for example, as shown in FIG. 6, it is desirable to store a table in which the brightness of an ambient light and the brightness (luminance) of the display image 200 are associated with each other in a memory unit such as a ROM described later. In the table shown in FIG. 6, corresponding to respective states of the ambient light "dark", "optimum" and "bright", the brightness (luminance) of the display image 200 is divided into three stages, that is, "dark", "optimum" and "bright" respectively. The HMD detects the difference between the actual brightness of the ambient light detected by the bright sensor 2 and the brightness of the display image 200 using the detection unit, and determines which one of three divided stages the brightness of the display image 200 belongs to by looking up the table. In the example shown in FIG. 6, when the brightness of the display image 200 is less than 2 times brighter than the brightness of the ambient light, the brightness of the display image 200 is determined to be "dark". When the brightness of the display image 200 is 2 to 5 times brighter than the brightness of the ambient light, the brightness of the display image 200 is determined to be "optimum". When the brightness of the display image 200 is more than 5 times brighter than the brightness of the ambient light, the brightness of the display image 200 is determined to be "bright". Predetermined values are allocated to the respective stages for deciding the degree-of-fatigue of the eye 101 of the user 100.

The decision unit accumulates the predetermined value allocated corresponding to a detection result of the detection unit for every unit time which is set to 1 minute or the like, for example. The decision unit decides timing where the accumulated value becomes equal to or more than a predetermined threshold value as stop timing. It is desirable to preliminarily set the above-mentioned predetermined value allocated corresponding to the detection result of the detection unit in a predetermined table. The table is explained in detail later.

In this manner, according to this embodiment, the stopping-of-use notification which prompts the user 100 to stop the use of the display part is performed at appropriate times properly corresponding to various use environments of the HMD and hence, it is possible to prevent eyestrain which the user 100 feels by using the display part from adversely affecting a health of the user 100 as much as possible.

As described previously, the control part 30 incorporated in the controller 3 performs a function of the determination unit, a function of the detection unit, a function of the decision unit and a function of the notification processing unit (see FIG. 4). The control part 30 is constituted of, as described in detail later, a computer which includes a CPU 31, a program ROM 32, a flash ROM 33, a RAM 34 and the like (see FIG. 9). In the control part 30, the CPU 31 functions as respective units in accordance with a control program stored in the program ROM 32.

The control program stored in the program ROM 32 may be recorded in a recording medium such as a CD-R or a DVD-R, for example. In this case, a predetermined external connection terminal may be provided to the controller 3, and a recording medium drive not shown in the drawing, for example, may be connected to the external connection terminal so that the control program is read by the flash ROM 33, for example, through the recording medium.

In FIG. 4, numeral 300 indicates a personal computer (hereinafter referred to as "PC"). The display image 200 displayed by the display part 1 of the HMD (see FIG. 1 to FIG. 3) is formed such that a request signal is transmitted to the PC 300 by the controller 3, and the display image 200 is formed based on image data transmitted to the controller 3 from the PC 300 which receives the request signal. That is, the image data is stored in a memory device such as a hard disk of the PC 300. The HMD according to this embodiment receives the supply of image data on the display image 200 to be displayed by the display part 1 from the PC 330.

Figure 7:
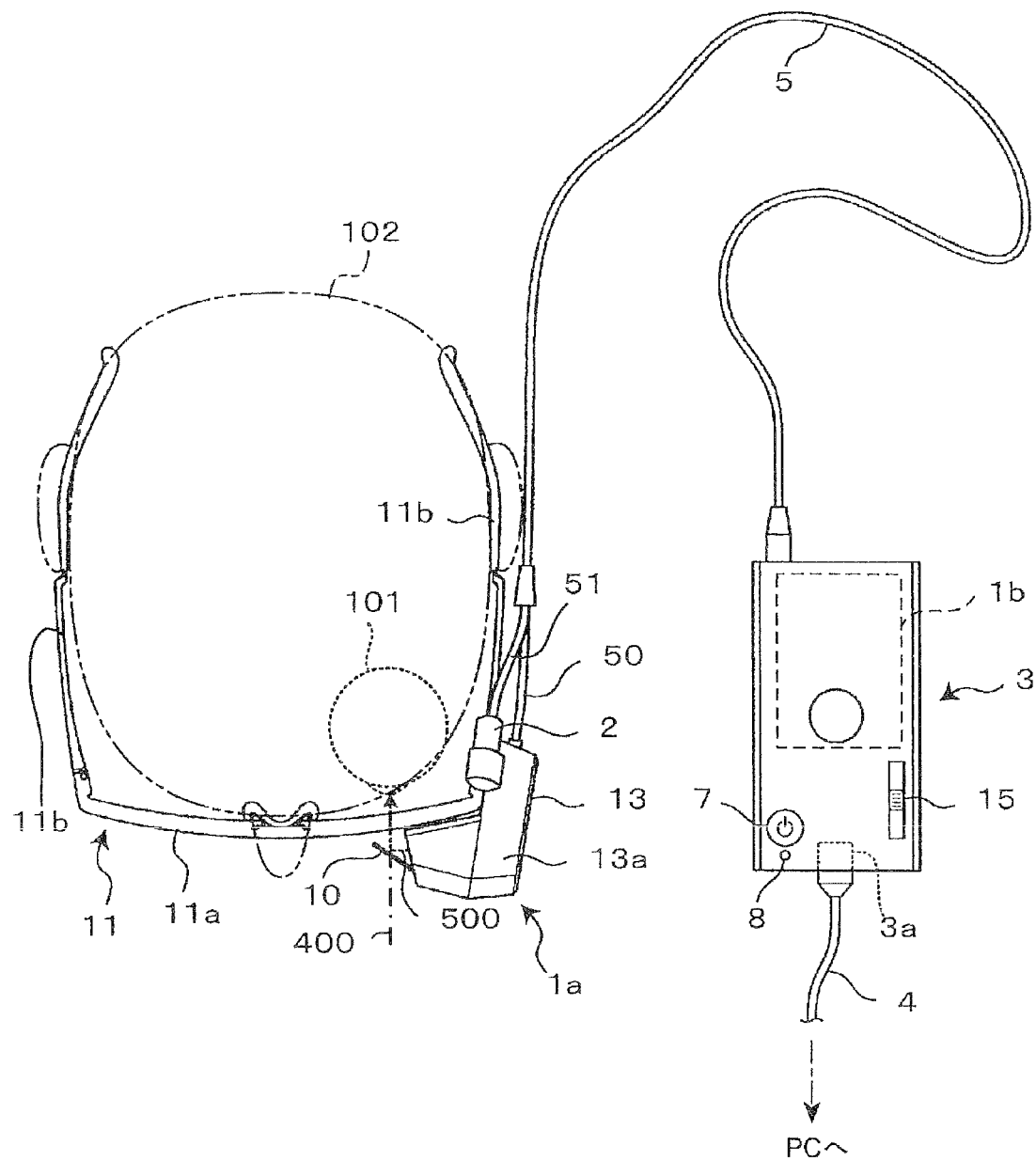
FIG. 7 is an explanatory view showing the constitution of the HMD according to one embodiment of the present invention.
Figure 8:
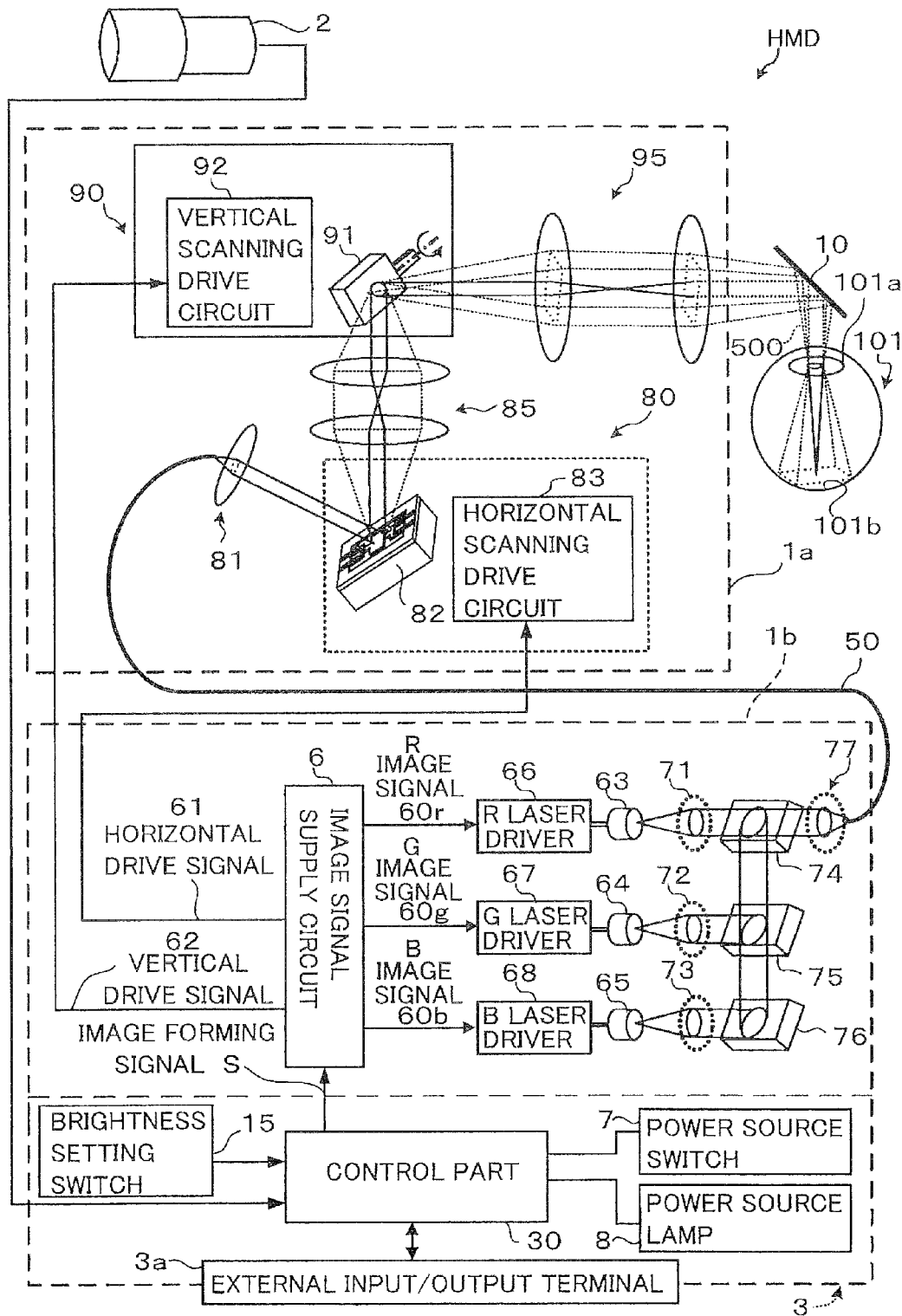
FIG. 8 is a block diagram showing the electrical constitution and the optical constitution of the HMD according to one embodiment of the present invention.
Figure 9:
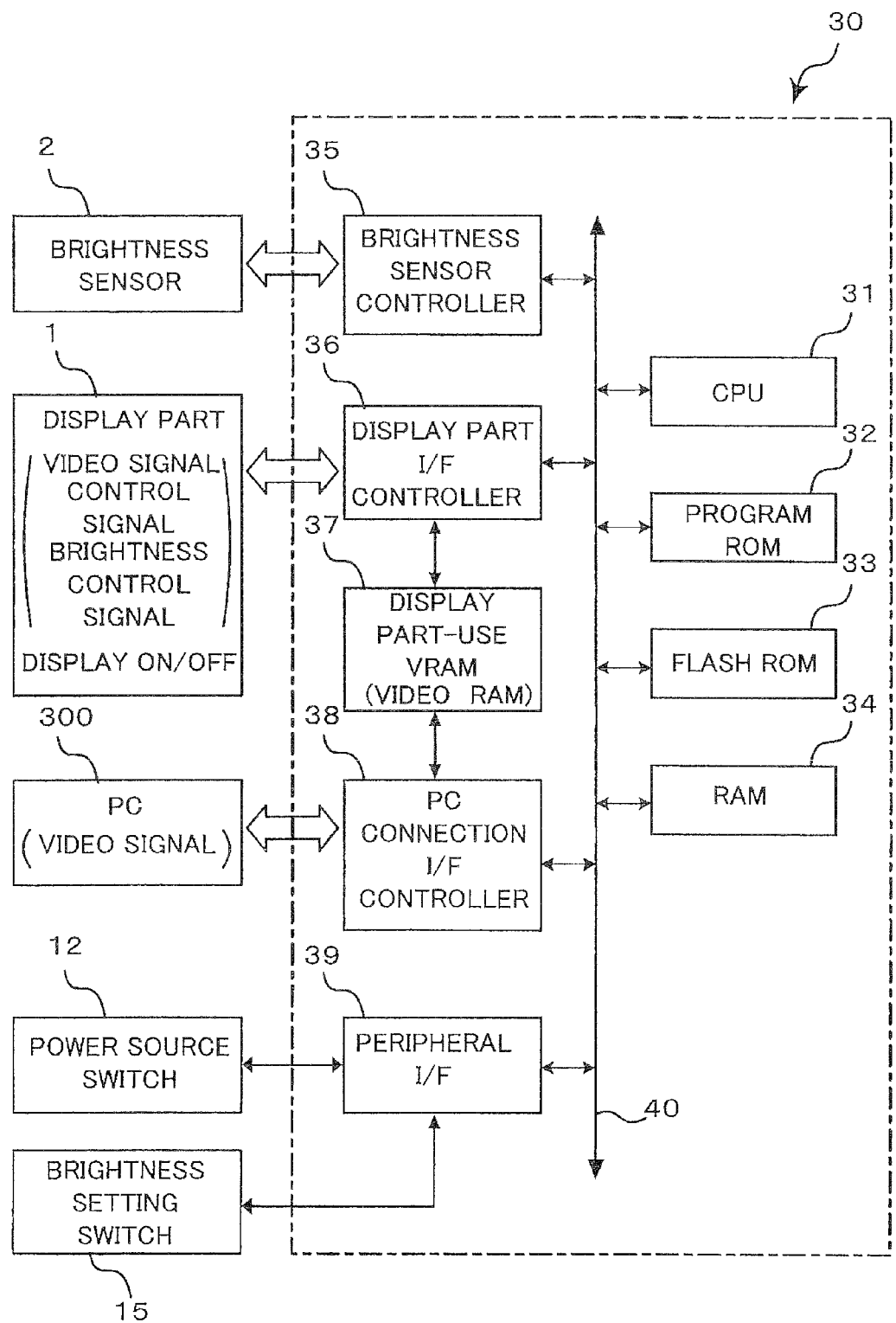
FIG. 9 is a block diagram of a control part.

The controller 3 includes a brightness setting switch 15 which performs the brightness setting of the display image 200 displayed by the display part 1 (see FIG. 7 to FIG. 9). The user 100 can, in recognizing the display image 200, adjust the brightness of the display image 200 to most visible brightness using the brightness setting switch 15. Accordingly, the above-mentioned determination unit can easily determine the brightness of the display image 200 by detecting the brightness (luminance) of the display image 200 set by the brightness setting switch 15. Here, the brightness setting switch 15 may be provided to the projection unit 1a in place of the controller 3. Further, the brightness of the display image 200 may be set on a PC 300 side which supplies data as described later.

The stopping of use information which prompts the user 100 to stop the display part 1 may be performed by projecting an image light corresponding to an image which prompts the stopping of use to the eye 101 of the user 100 from the display part 1. Further, such stopping-of-use notification may be performed such that an earphone is attached to the HMD so that the HMD can prompt the user 100 to stop the use of the display part 1 by outputting a voice. As a matter of course, the stopping-of-use notification may be performed using the combination of an image light and a voice.

(Appearance and Specific Constitution of HMD)

The summary of the HMD according to this embodiment has been explained heretofore. The appearance and the more specific constitution of the HMD are explained in detail hereinafter.

As shown in FIG. 7, the HMD includes a housing 13 in which the projection unit 1a is housed, the eyeglass frame-type mounting portion 11 which supports the housing 13, and the controller 3 which is provided with the light source unit 1b and the control part 30 (see FIG. 8).

The housing 13 is formed of a box having an approximately L shape as viewed in a plan view such that the housing 13 covers a left eye portion and a left temple portion of the user 100 when the HMD is put on the head 102. The brightness sensor 2 for detecting brightness of an outside field (brightness of an ambient light) is mounted on a top surface 13a of the housing 13 in place. Further, the half mirror 10 is mounted on a distal end surface 13b of the housing 13 from which an image light 500 is radiated such that the half mirror 10 is positioned in front of the left eye 101. That is, in the HMD according to this embodiment, as shown in FIG. 2, the ambient light 400 passes through the half mirror 10 and is incident on the left eye 101 of the user 100. The image light 500 is reflected on the half mirror 10 and is incident on the eye 101 of the user 100. Accordingly, the user 100 can also observe the outside field while recognizing the display image 200.

The mounting portion 11 is constituted of a front frame 11a which imitates a lens frame of eyeglasses, and engaging frames 11b, 11b which are mounted on left and right sides of the front frame 11*a* respectively. Due to such a constitution, the user 100 can easily put on the housing 13 in which the projection unit 1*a* is housed on his head 102 as if the user 100 wears eyeglasses.

The light source unit 1b of the controller 3 is connected to the PC 300 through an external connection cable 4. The light source unit 1*b* is connected to the projection unit 1*a* through the optical fiber cable 50, and is connected to the brightness sensor 2 through a sensor connection cable 51 and the control part 30 (see FIG. 8). A transmission cable 5 is a cable which integrally covers the optical fiber cable 50, the sensor connection cable 51 and the like by coating. The light source unit 1*b* includes an image signal supply circuit 6 described later. The light source unit 1*b*, based on image data transmitted from the PC 300, forms an image light 500 which is subject to intensity modulation for every pixel of an image. The light source unit 1*b* transmits the image light 500 to the projection unit 1*a* through the optical fiber cable 50. The projection unit 1*a* scans the transmitted image light 500, and allows the user 100 to visually recognize the display image 200 (see FIG. 1 to FIG. 3).

The controller 3 includes the brightness setting switch 15, a power source switch 7, a power source lamp 8, and an external input/output terminal 3*a*. The user 100 can set the brightness, that is, the luminance of the display image 200 by operating the brightness setting switch 15. The user 100 brings the HMD into an operation ready state by turning on the power source switch 7. The power source lamp 8 performs a lighting display when the HMD is in an operation ready state. The external connection cable 4 is connected to the external input/output terminal 3*a* which is connected to the control part 30. The control part 30 of the controller 3 performs transmission/reception of various data including image data and various control signals between the control part 30 and the PC 300 through the external connection cable 4.

(Electrical Constitution and Optical Constitution of HMD)

Next, the electrical constitution and the optical constitution of the HMD are explained in conjunction with FIG. 8. As shown in FIG. 8, the HMD includes the projection unit 1*a*, the controller 3 and the brightness sensor 2. The controller 3 includes the control part 30 and the light source unit 1*b*. The control part 30 performs a systematic control of the operation of the whole HMD. The light source unit 1*b* reads a video signal supplied from the control part 30 for every dot clock, and generates a laser beam whose intensity is modulated corresponding to the read video signal. In the HMD of this embodiment, the display part 1 is constituted of the projection unit 1*a* and the light source unit 1*b*.

The control part 30 functions as the previously-mentioned determination unit, detection unit, decision unit, notification processing unit and the like by executing predetermined processing described later in accordance with the control program stored in the control part.

The light source unit 1*b* includes an image signal supply circuit 6 which generates signals or the like which constitute elements for composing an image. The control part 30 generates an image forming signal S based on the image signal supplied from the PC 300. The control part 30 transfers the image forming signal S to the image signal supply circuit 6. The image signal supply circuit 6 generates respective signals which constitute elements for composing the display image 200 based on the image forming signal S. That is, the image signal supply circuit 6 outputs an R (red) image signal 60*r*, a G (green) image signal 60*g*, and a B (blue) image signal 60*b*. Further, the image signal supply circuit 6 outputs a horizontal drive signal 61 which is used in a horizontal scanning part 80, and a vertical drive signal 62 which is used in a vertical scanning part 90. The light source unit 1*b* includes an R laser 63, a G laser 64, a B laser 65, an R laser driver 66, a G laser driver 67, and a B laser driver 68. The R laser 63, the G laser 64 and the B laser 65 radiate laser beams based on respective image signals 60*r*, 60*g*, 60*b* (the R (red) image signal 60*r*, the G (green) image signal 60*g* and the B (blue) image signal 60*b*) outputted from the image signal supply circuit 6 for every dot clock.

The R laser driver 66 drives the R laser 63, the G laser driver 67 drives the G laser 64, and the B laser driver 68 drives the B laser 65. Here, each laser 63, 64, 65 may be constituted of a semiconductor laser or a solid-state laser having a harmonics generating mechanism, for example. When the semiconductor laser is used as the laser 63, 64, 65, the intensity of the laser beam may be modulated by directly modulating a drive current. On the other hand, when the solid laser is used as the laser 63, 64, 65, it is necessary to modulate the intensity of the laser beam by providing an external modulator to each laser 63, 64, 65. Further, the light source unit 1*b* includes collimation optical systems 71, 72, 73, dichroic mirrors 74, 75, 76, and a coupling optical system 77. The collimation optical systems 71, 72, 73 collimate the laser beams radiated from the respective lasers 63, 64, 65. The dichroic mirrors 74, 75, 76 compose the collimated laser beams. The coupling optical system 77 guides the composed laser beams to the optical fiber cable 50. The laser beams radiated from the respective lasers 63, 64, 65 are collimated by the collimation optical systems 71, 72, 73 respectively. The collimated laser beams are incident on the dichroic mirrors 74, 75, 76. Thereafter, the respective laser beams are selectively reflected on or are allowed to pass through these dichroic mirrors 74, 75, 76 corresponding to wavelengths thereof. The laser beams of three primary colors which are respectively incident on these three dichroic mirrors 74, 75, 76 are reflected on the dichroic mirrors 74, 75, 76 or are allowed to pass through the dichroic mirrors 74, 75, 76 selectively corresponding to wavelengths thereof, arrive at the coupling optical system 77, and are converged by the coupling optical system 77. Then, the converged laser beams are outputted to the optical fiber cable 50.

The projection unit 1*a* is positioned between the light source unit 1*b* and an eye 101 of the user 100. The projection unit 1*a* includes a collimation optical system 81, the horizontal scanning part 80, the vertical scanning part 90, a first relay optical system 85, and a second relay optical system 95.

The collimation optical system 81 collimates the laser beams which are generated by the light source unit 1b and are radiated through the optical fiber cable 50. The collimated laser beams are incident on the horizontal scanning part 80.

The horizontal scanning part 80 scans the laser beams collimated by the collimation optical system 81 in the horizontal direction in a reciprocating manner for displaying an image. The horizontal scanning part 80 includes a resonance-type deflection element 82 having a deflection surface for scanning the laser beams in the horizontal direction, and a horizontal scanning drive circuit 83 which generates a drive signal for producing resonance in the resonance-type deflection element 82 so as to oscillate the deflection surface of the resonance-type deflection element 82. The laser beams which are scanned in the horizontal direction are incident on the first relay optical system 85.

The first relay optical system 85 is arranged between the horizontal scanning part 80 and the vertical scanning part 90. The first relay optical system 85 relays the laser beams which are scanned in the horizontal direction to the vertical scanning part 90.

The vertical scanning part 90 scans the laser beams which are incident from the first relay optical system 85 in the vertical direction. The vertical scanning part 90 includes a Galvano mirror 91 for scanning the laser beams in the vertical direction, and a vertical scanning drive circuit 92 which performs a drive control of the Galvano mirror 91. The vertical scanning part 90 scans the laser beams in the vertical direction toward a final scanning line from a first scanning line for every 1 frame of an image to be displayed. The laser beams which are scanned in the vertical direction are incident on the second relay optical system 95 as an image light 500 consisting of scanned laser beams.

The second relay optical system 95 is configured such that two lenses having a positive refractive power are arranged in series. The second relay optical system 95 radiates the laser beams scanned in the horizontal direction and in the vertical direction to the half mirror 10.

The image light 500 is reflected on the half mirror 10 arranged in front of the eye 101 and is incident on a pupil 101a of the user 100. The incident image light 500 is scanned and is projected on a retina 101b thus allowing the user 100 to visually recognize the image light 500 as the display image 200 (see FIG. 2 and FIG. 3).

(Constitution of Control Part)

Next, the constitution of the control part 30 which the controller 3 includes is explained in conjunction with FIG. 9.

The control part 30 includes a CPU (Central Processing Unit) 31, a program ROM (Read Only Memory) 32, a flash memory (flash ROM) 33, a RAM (Random Access Memory) 34, and a brightness sensor controller 35. The control part 30 also includes a display part interface controller 36, a display part-use VRAM 37, a PC connection interface controller 38, and a peripheral (peripheral equipment-use) interface 39. These elements are mutually connected with each other through a system bus 40.

The program ROM 32 which constitutes one example of the memory part stores a control program. The control part 30 executes the control program using the CPU 31 which constitutes an arithmetic processing device thus realizing processing which are executed in accordance with flowcharts described later. Accordingly, the control part 30 functions as the determination unit, the detection unit, the decision unit and the notification processing unit described above (see FIG. 4). Further, the control part 30 functions also as a count unit and a time measuring unit as described later.

The flash ROM 33 which constitutes one example of the memory part stores various kinds of tables including a fatigue determination table (see FIG. 12A to FIG. 12C) described later, various kinds of flags, image data, a set value of the brightness of the display image 200 and the like.

The RAM 34 functions as a temporary storage region which temporarily stores the fatigue determination table, the various kinds of flags, image data and the like which are referenced by the CPU 31.

The brightness sensor controller 35 is provided for establishing the connection between the control part 30 and the brightness sensor 2. The brightness sensor controller 35 requests the brightness sensor 2 to transmit data on light quantity indicative of a level of ambient light. The brightness sensor controller 35 applies arithmetic processing to data received from the brightness sensor 2 thus obtaining a brightness value comparable with the brightness of the display image 200.

The display part interface controller 36 is provided for establishing the connection between the control part 30 and the display part 1 (image signal supply circuit 6). The display part interface controller 36 generates image forming signals S based on data stored in the display part-use VRAM 37, and supplies the image forming signals S to the image signal supply circuit 6. The image forming signals S include a video signal, a control signal and a brightness control signal supplied to the display part 1. The control signals are signals for controlling an ON/OFF state of a power source switch 12, a position of an image display, a focal point and the like. The brightness control signal is a signal for controlling the brightness corresponding to the brightness set by the brightness setting switch 15, and includes a control signal which controls an ON/OFF state of a display. Further, the display part interface controller 36 can receive information indicative of a state of the brightness of the actually-displayed display image 200 from the display part 1.

The display part-use VRAM 37 stores image forming data necessary for forming the display image 200 which the user 100 visually recognizes. The display part-use VRAM 37 is connected to the display part interface controller 36 and the PC connection interface controller 38.

The PC connection interface controller 38 is provided for establishing the connection between the control part 30 and the PC 300. The PC connection interface controller 38 performs the transmission/reception of video signals between the control part 30 and the PC 300, and writes image data requested by CPU 31 in the display-part-use VRAM 37.

The peripheral (equipment-use) interface 39 is provided for performing an operation control of peripheral equipment connected to the control part 30 and the transmission/reception of signals. The power source switch 12 which brings the HMD into an operation ready state and the brightness setting switch 15 are connected to the peripheral interface 39.

The brightness setting switch 15 is an adjustment part for adjusting a set value of the brightness (luminance) of the display image 200 displayed by the display part 1. The control part 30 transmits a brightness control signal corresponding to setting of the brightness by the brightness setting switch 15 to the display part 1 thus allowing the display image 200 to exhibit brightness which the user 100 desires. This brightness control signal is a signal which is used for controlling the brightness of the whole display image 200 by controlling peak beam outputs of the respective (R G B) lasers in displaying white corresponding to a level set by the brightness setting switch 15.

Figure 10A:
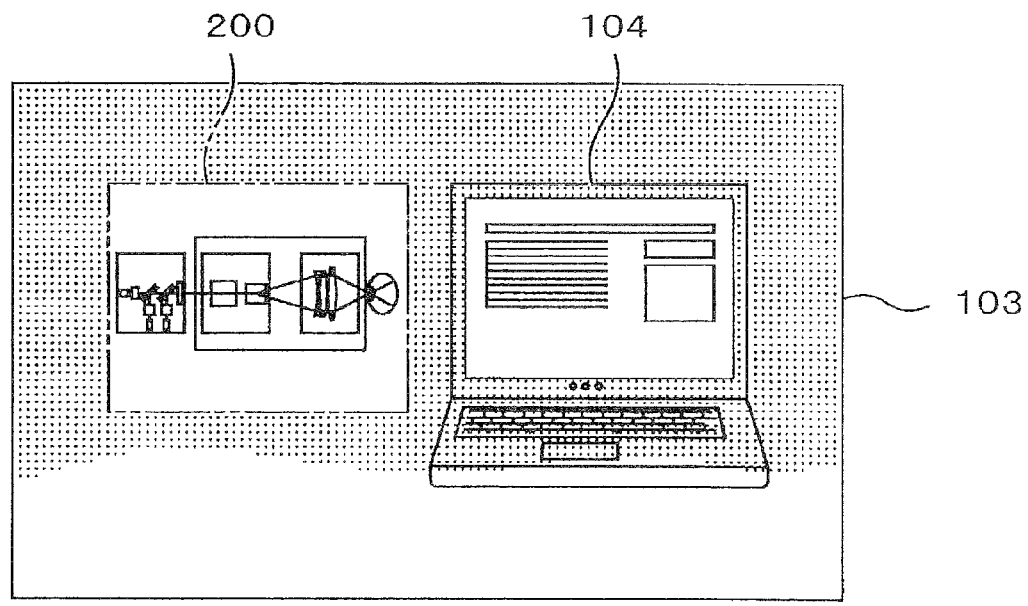
FIG. 10A is an explanatory view showing a use state of a brightness setting switch.

As shown in FIG. 10A, when the brightness (luminance) of the display image 200 is remarkably higher than the brightness of the outside field in the sight 103 so that the display image 200 is excessively glaring or the like, the user 100 can perform the brightness adjustment by operating the brightness setting switch 15 mounted on the controller 3.

Figure 10B:
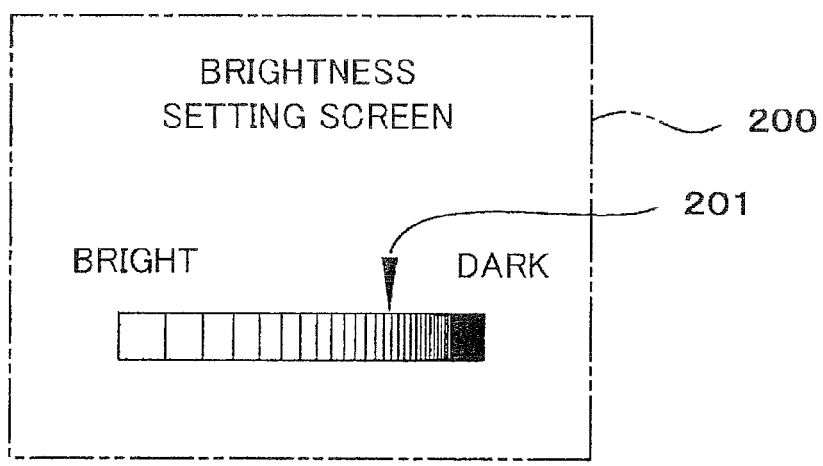
FIG. 10B is an explanatory view showing a use state of the brightness setting switch.
Figure 10C:
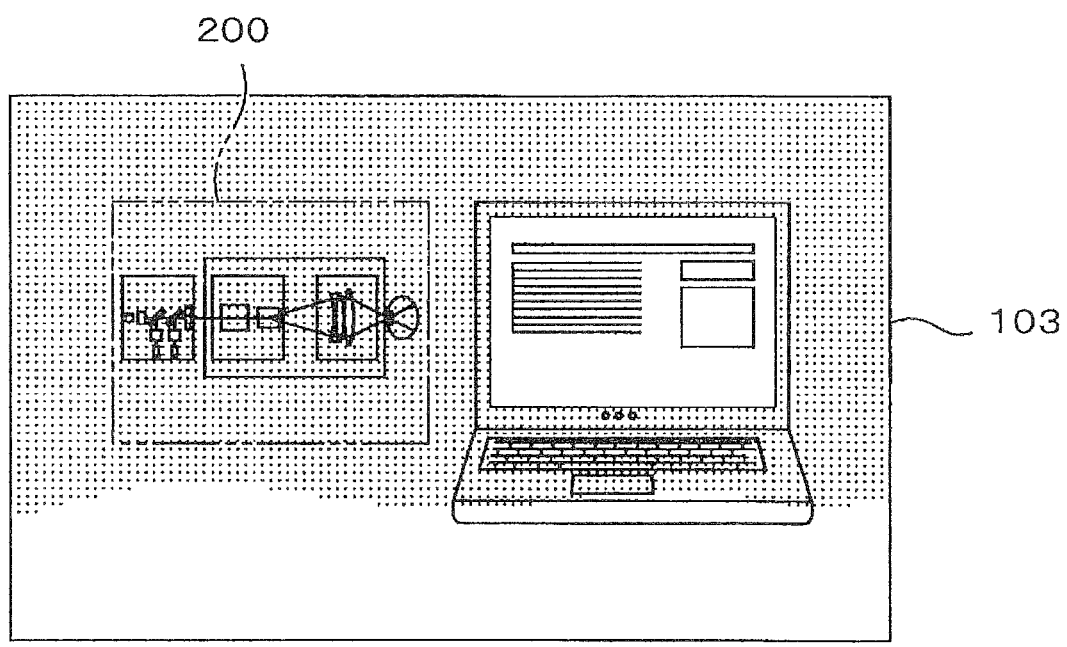
FIG. 10C is an explanatory view showing a use state of the brightness setting switch.

When the user 100 operates the brightness setting switch 15, as shown in FIG. 10B, a brightness setting screen in which the brightness is displayed in order of "bright"→"dark" is displayed within the display image 200. A pointer 201 is displayed in the setting screen such that the pointer 201 is movable corresponding to an operation of the brightness setting switch 15. The display image 200 is excessively bright in this situation and hence, the user 100 operates the brightness setting switch 15 so as to move the pointer 201 to the "dark" side. As a result, as shown in FIG. 10C, the brightness of the display image 200 is lowered so that the difference between the brightness of the display image 200 and the brightness of the outside field is narrowed and hence, the user 100 can observe the display image 200 without receiving a burden on his eye 101.

Here, the control part 30 functions as the determination unit, and monitors the brightness set by the brightness setting switch 15 at predetermined time intervals. Accordingly, the control part 30 can constantly acquire the brightness of the display image 200.

The brightness of the display image 200 can be set (or changed) on a PC 300 side. As shown in FIG. 11, the brightness setting can be performed as one step of display control processing using a predetermined image application incorporated in the PC 300.

That is, as shown in the drawings, when electricity is supplied to the PC 300 connected to the controller 3 of the HMD, the CPU of the PC 300 starts the predetermined image application (step S600). The CPU executes the initial setting processing corresponding to the image application (step S610). Next, the CPU of the PC 300 determines whether or not an image transmission request from the display part 1 of the HMD is present (step S620). When the image transmission request from the display part 1 of the HMD is present (step S620: Yes), the CPU develops the requested image on the VRAM (step S630). Then, the CUP of the PC 300 transmits the requested image and a brightness set value which is set to a default by the PC 300 to the display part 1 of the HMD (step S640), and returns the processing to step S620. In this manner, the display part 1 can display the requested image transmitted from the PC 300 with the brightness set to the default.

Further, in step S620, when the image transmission request is not present (step S620: No), the CPU determines whether or not a brightness setting operation is performed (step S650). When the brightness setting operation is not performed (step S650: No), the CPU advances the processing to step S690, executes other processing using an image application such as image selection or page feeding, and returns processing to step S620.

On the other hand, when the brightness setting operation is performed in step S650 (step S650: Yes), the CPU executes the brightness setting processing (step S660). Next, the CPU writes a brightness set value in a brightness setting memory mounted in the PC 300 (step S670). Then, the CPU transmits the written brightness set value to the display part 1 of the HMD (step S680), and returns the processing to step S620. Due to such processing, the display part 1 can change the brightness of the display image 200 being displayed to the brightness transmitted from the PC 300. In this manner, the brightness of the display image 200 displayed by the display part 1 can be newly set or changed not only by operating the brightness setting switch 15 provided to the HMD but also by performing the necessary operation on the PC 300 side.

Here, the fatigue determination table which constitutes one of various tables stored in the flash ROM 33 is explained. In the fatigue determination table shown in FIG. 12A, brightness of an ambient light (unit: candela per square meters ($cd/m^2$) and the brightness (luminance) of the display image 200 are associated with each other. In the fatigue determination table of this embodiment, the brightness of the ambient light is divided into three stages consisting of a dark stage in which the brightness of the ambient light is low ("less than 95 ($cd/m^2$)"), an optimum stage in which the brightness of the ambient light is optimum ("95 to 477 ($cd/m^2$)"), and a bright stage in which the brightness of the ambient light is high ("more than 477 ($cd/m^2$)").

In general, the brightness of 300 to 1500 lux (lx) is considered to be the brightness in a proper range where the brightness is not excessively high or excessively low. Accordingly, in this embodiment, as the optimum brightness of the ambient light, 286 candela (900 lux (lx)) is defined as a center value. Here, it is known that 1 (lx) approximates $1/\pi in(cd/m^2)$ and hence, 900 (lx) becomes 286 ($cd/m^2$).

Further, the brightness (luminance) of the display image 200 is expressed by a white level (brightness) of the display image 200. In this embodiment, the brightness (luminance) of the display image 200 is expressed as the degree of brightness of the white level of the display image 200 using the brightness of the ambient light as the reference. Further, the brightness of the white level is, as described previously, associated with the brightness of the ambient light divided into three stages consisting of "dark stage", "optimum stage" and "bright stage". In this embodiment, as shown in FIG. 12A, a ratio of the brightness of the white level of the display image 200 for the brightness of the ambient light divided into three stages is further divided into three stages respectively. Then, coefficients which are allocated to decide the degree-of-fatigue of the user 100 are set corresponding to the respective ratios. The magnitude of values of the coefficients corresponds to the magnitude of the degree-of-fatigue. Here, the brightness of the display image 200 may be set to the brightness set by the brightness setting switch 15.

For example, when the brightness of the ambient light belongs to "dark stage (less than 95 ($cd/m^2$))" and the brightness of the white level of the display image 200 set by the brightness setting switch 15 is "less than 2 times" higher than the brightness of the ambient light, the coefficient value is set to "9". When the brightness of the ambient light belongs to "dark stage (less than 95 ($cd/m^2$))" and the brightness of the white level of the display image 200 set by the brightness setting switch 15 is "2 to 5 times" higher than the brightness of the ambient light, the coefficient value is set to "7". When the brightness of the ambient light belongs to "dark stage (less than 95 ($cd/m^2$))" and the brightness of the white level of the display image 200 set by the brightness setting switch 15 is "more than 5 times" higher than the brightness of the ambient light, the coefficient value is set to "9". Here, people are apt to consider that when the bright display image 200 is displayed in a dark room or the like, the display image 200 is displayed conspicuously so that the progress of the degree of eyestrain the user 100 feels is suppressed. However, it is known that, in an actual use of the image display device, both dark light and bright light enter the eye 101 of the user 100 and hence, the user 100 is embarrassed in determining environment on which the user 100 has to focus his eye 101. Accordingly, the eye 101 of the user 100 is strained so that the user 100 easily feels fatigue. In this embodiment, when the brightness of the ambient light is low and the brightness of the white level of the display image 200 is "more than 5 times" higher than higher than the brightness of the ambient light, the maximum value "9" is allocated. On the other hand, when the brightness of the ambient light is low and the brightness of the ambient light is also low, the brightness of the display image 200 becomes lowest and hence, visibility of the user is worsened whereby the user 100 easily feels fatigue. Accordingly, the maximum value "9" is allocated as the coefficient value.

Further, when the brightness of the ambient light belongs to "optimum stage (95 to 477 ($cd/m^2$))" and the brightness of the white level of the display image 200 is "less than 2 times" higher than the brightness of the ambient light, the coefficient value is set to "7". When the brightness of the ambient light belongs to "optimum stage (95 to 477 ($cd/m^2$))" and the brightness of the white level of the display image 200 is "2 to 5 times" higher than the brightness of the ambient light, the coefficient value is set to "5". Further, when the brightness of the ambient light belongs to "optimum stage (95 to 477 ($cd/m^2$))" and the brightness of the white level of the display image 200 is "more than 5 times" higher than the brightness of the ambient light, the coefficient value is set to "7". That is, the brightness of the ambient light is optimum and hence, maximum "9" is not set as the coefficient value. When the brightness of the white level of the display image 200 is "2 to 5 times" which is considered optimum, minimum "5" is set as the coefficient value. An intermediate value "7" is allocated as the coefficient value in other cases.

Further, when the brightness of the ambient light belongs to "bright stage (more than 477 $(cd/m^2)$)" and the brightness of the white level of the display image 200 is "less than 2 times" higher than the brightness of the ambient light, the coefficient value is set to "9". When the brightness of the ambient light belongs to "bright stage (more than 477 $(cd/m^2)$)" and the brightness of the white level of the display image 200 is "2 to 5 times" higher than the brightness of the ambient light, the coefficient value is set to "7". When the brightness of the ambient light belongs to "bright stage (more than 477 $(cd/m^2)$)" and the brightness of the white level of the display image 200 is "more than 5 times" higher than the brightness of the ambient light, the coefficient value is set to "9". That is, the brightness of the ambient light is high and hence, a stimulus to the eye 101 is basically strong whereby "5" which is considered minimum is not set as the coefficient value. When the brightness of the white level of the display image 200 which is considered optimum is "2 to 5 times" higher than the brightness of the ambient light, the intermediate value "7" is allocated as the coefficient value. The maximum "9" is allocated as the coefficient value in other cases.

Further, in the fatigue determination table, an accumulated value of coefficients which becomes an index for deciding stop timing for temporarily stopping the use of the display part 1 by the user 100 is associated as a threshold value. This accumulated value is divided into N stages corresponding to the number of times that the display part 1 is used as fatigue determination classes. The higher the class becomes, the smaller the threshold value becomes.

That is, the control part 30 functions as a count unit which counts the number of continuous use times of the display part 1 by the user 100. For respective fatigue determination classes in N stages which are set corresponding to the result of the number of times that the display part 1 is used which is counted by the control part 30, a threshold value of the accumulated value of coefficients is set. The above-mentioned each threshold value constitutes an index of stop timing. The larger the count number, the larger the fatigue determination class becomes and the smaller the threshold value becomes. Here, the "number of continuous use times" is, for example, the number of times counted when the display part 1 is operated until the accumulated value of the coefficients approximates the threshold value and, thereafter, the display part 1 is again driven after stopping of less than 20 minutes for allowing the user 100 to visually recognize the display image 200.

In this manner, the fatigue determination table is a table in which values (the coefficients and the threshold value of the accumulated value of the coefficients) which become a basis based on which the control part 30 determines fatigue of the user 100 are allocated corresponding to a result of detection of the difference between the brightness of the ambient light and the brightness of the display image 200. The control part 30, when the user 100 starts the use of the HMD, detects difference between the brightness of the ambient light and the brightness of the display image. Based on the detection result, the control part 30 selects a predetermined value (coefficient) from the fatigue determination table, and accumulates the allocated values for every unit time. The control part 30 decides stop timing where the use of the display part 1 is stopped by the user 100 based on an extent that the accumulated value approaches the threshold value in the respective fatigue determination classes defined in the fatigue determination table. The control part 30 displays a predetermined alarm image 250 shown in FIG. 5A and FIG. 5B or forcibly turns off the display of the display image 200 by the display part 1 at the stop timing decided in this manner.

That is, in the HMD of this embodiment, the ratio of the accumulated value of the coefficients acquired for every 1 minute with respect to the threshold value is set as the fatigue determination value and the mode which prompts the user to stop the use of the display part 1 is changed based on the fatigue determination value. For example, when the fatigue determination value is 90 to 100%, the control part 30 displays the alarm image 250. When the fatigue determination value is more than 100%, the control part 30 stops the outputting of the image light from the light source unit 1b so as to forcibly prevent the display image 200 from being displayed by the display part 1 or to bring the display part 1 into an OFF state by stopping the supply of electricity to the display part 1 per se.

For example, when the user 100 turns on the power source switch 12 to use the HMD, the CPU 31 of the control part 30 operates the display part 1 through the display part interface controller 36 and, at the same time, counts the number of use times as "1" and stores the number of use times "1" in a predetermined memory region of the RAM 34. When the number of use times is "1", the threshold value is "300".

Further, the control part 30 also functions as a time measuring unit which measures a time during which the use of the display part 1 by the user 100 is stopped. The control part 30 can measure the time based on information transmitted from a clock generation circuit or the like not shown in the drawing. The control part 30 determines, when the display part interface controller 36 stops outputting of a video signal to the display part 1, such a stop as the stopping of use of the display part 1 (image display stopping). The control part 30 measures a time from a point of time where the control part 30 determines the state of the display part 1 as the stopping of use to a next point of time where the video signal is outputted to the display part 1 from the display part interface controller 36, that is, a point of time that the video signal is displayed again. The control part 30 stores a result of time measurement in a predetermined region of the RAM 34.

Then, the control part 30, when the time during which the user 100 gives his eye 101 a rest is only 10 minutes to 20 minutes, for example, as a result of this time measurement, determines that the rest is insufficient so that the use of the display part 1 is a pseudo continuous use close to the continuous use even though the use is not the continuous use. When the control part 30 determines that the use is the pseudo continuous use, the number of use times "2" is counted for lowering the threshold value for fatigue determination and this number of use times "2" is stored in a predetermined memory region of the RAM. The control part 30 measures, after the redisplay is performed, in the same manner as the above-mentioned operation, a time which elapses until the next redisplay is performed after the display by the display part 1 is stopped. When this time is less than 10 minutes to 20 minutes, the control part 30 again determines that the use of the display part 1 is the pseudo continuous use of the display part 1. When the control part 30 determines that the state of the display part 1 is the pseudo continuous use, the control part 30 counts the number of continuous use times "3" of the display part 1, and stores the number of use times "3" in the predetermined memory region of the RAM.

That is, in determining the stop timing where the use of the display part 1 by the user 100 is temporarily stopped by looking up the previous fatigue determination table, the control part 30 corrects a result of counting indicative of the number of use times of the display part 1 based on the result of time measurement. For example, when the measured time is approximately 10 minutes to 20 minutes, the control part 30 determines that the state of the display part 1 is the pseudo continuous use, rewrites the count value from "1" to "2", also increases the fatigue determination class from "1" to "2", and looks up a threshold value in the changed fatigue determination class. In this embodiment, when the result of counting shows that the number of use times is the continuous second time, the threshold value is set to "250". In the same manner, when the result of counting shows that the number of use times is the continuous third time, the control part 30 further increases the fatigue determination class to "3" so that the threshold value becomes "200". When the result of counting shows that the number of use times is the continuous fourth time, the control part 30 further increases the fatigue determination class "4" so that the threshold value becomes "150". That is, the longer the continuous use time, the more the fatigue determination class is also changed in the increasing direction, and the more the stop timing is also shortened. Accordingly, for example, when the result of counting by which it is estimated that the user 100 gives his eye 101 a sufficient rest is obtained, when using the display part 1 next time, the timing for notifying the stopping of use is delayed so that the use time of the display part 1 can be set longer than the previous time and hence, there is no possibility that the user friendliness of the HMD is damaged.

Then, the control part 30 calculates the fatigue determination value in each fatigue determination class. As described previously, when the fatigue determination value is 90 to 100%, the control part 30 displays the alarm image 250 so as to prompt the user 100 to give his eye 101 a rest. When the fatigue determination value is more than 100%, the control part 30 turns off the display image 200 or brings the display part 1 into a power source OFF state thus forcibly prompting the user 100 to give his eye 101 a rest.

In this manner, according to this embodiment, even when the user 100 uses the display part 1 while taking a rest or a break, when the use stopping time is from 10 minutes to 20 minutes, the timing where the next stopping of use is prompted comes earlier. On the other hand, when the user 100 continuously uses the display part 1 without taking a rest, the display image 200 is forcibly brought into a state where the user 100 cannot observe the display image 200 in order that the eye 101 of the user 100 can have a rest.

When the stopping of use time (rest time) of the display part 1 becomes more than 20 minutes, the control part 30 determines that the eye 101 of the user 100 has a sufficient rest and, as described later, processing for decreasing the fatigue determination class is performed so as to increase the threshold value.

FIG. 12B and FIG. 12C show a modification of the fatigue determination table. In the fatigue determination table shown in FIG. 12B, the brightness of an ambient light is defined based on luminance (unit: lux (lx)). Also in this fatigue determination table, a center value of the optimum brightness is set to 900 lux (lx). Further, FIG. 12C shows the brightness of an ambient light defined by a ratio (%) when an optimum value of the brightness of the ambient light is set to 900 lux (lx) (=286 candela (cd/m$^2$)). Here, when the brightness is within ±70% of 900 lux (lx) (=286 candela (cd/m$^2$)) which is defined as the optimum value, the brightness falls within a proper range which does not largely exert the adverse effect on the visibility of the display image 200.

(Processing Flow of Control Part)

Next, the processing performed by the control part 30 is explained in conjunction with FIG. 13A to FIG. 16. FIG. 13A, FIG. 13B, FIG. 14A and FIG. 14B show processing which is started when the system power source switch of the HMD is turned on. The HMD according to this embodiment includes, although not shown in the drawing, a display part power source switch for displaying an image by the display part 1 besides the above-mentioned system power source switch.

Figure 13A:
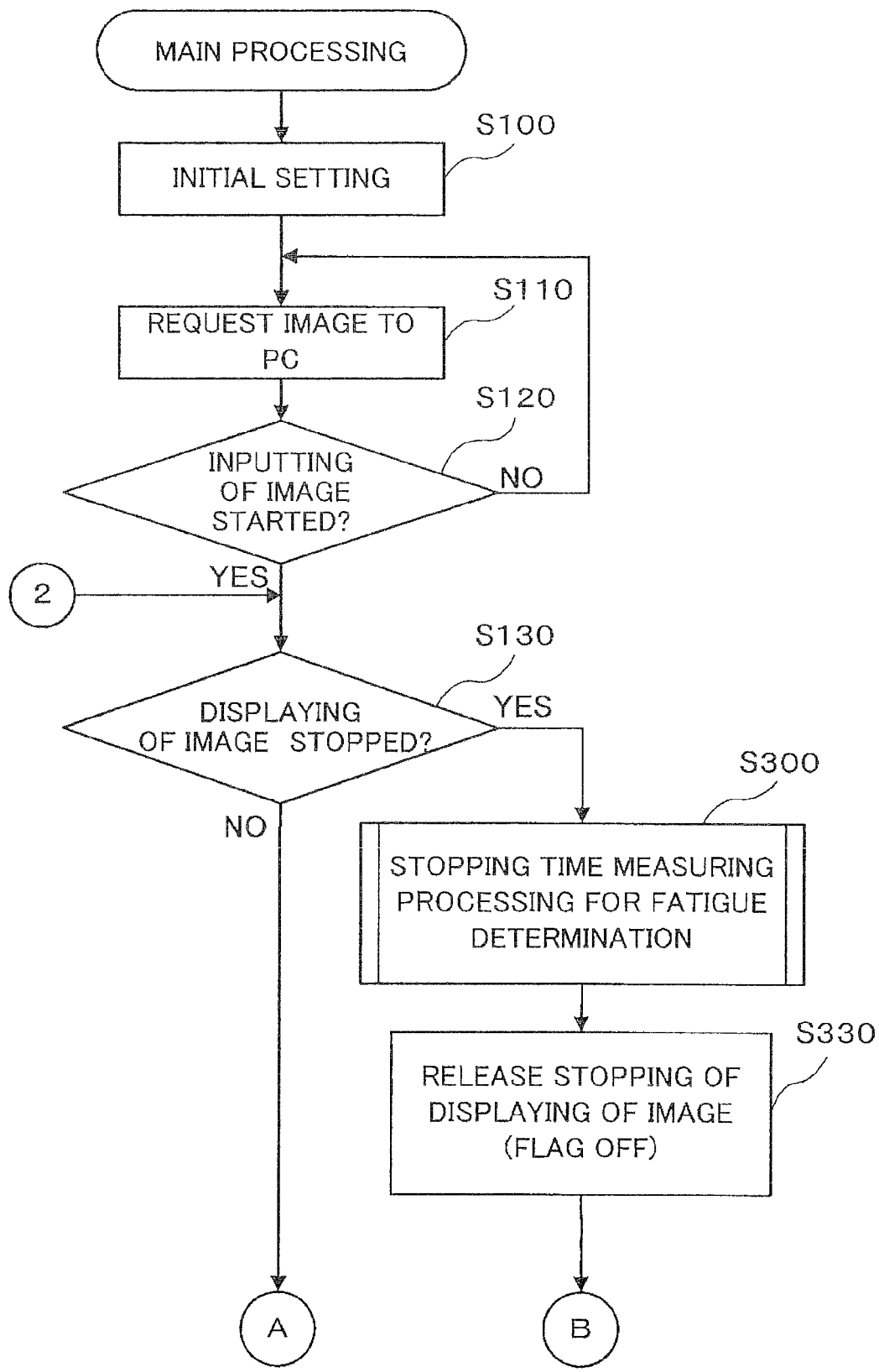
FIG. 13A is a flowchart showing main processing of the HMD according to one embodiment of the present invention.

As shown in FIG. 13A, firstly, the CPU 31 of the control part 30 executes the initial setting processing such as permitting of access to the RAM 34, and initialization of a working area (step S100).

Next, the CPU 31 outputs an image request signal for displaying a display image 200 by the display part 1 to the PC 300 (step S110).

In step S120, the CPU 31 waits while determining whether or not the inputting of a video signal from the PC 300 is started (step S120: No). When the CPU 31 determines that the inputting of the video signal is started (step S120: Yes), the CPU 31 determines whether or not the display part 1 assumes a state where an image (display image 200) is not displayed (stopping of displaying an image) (step S130).

In step S130, the CPU 31 determines whether or not the display of the display image (display image 200) is stopped. When the CPU 31 determines that the display is not stopped (step S130: No), the CPU 31 advances the processing to step S135. As shown in FIG. 13B, in step S135, the CPU 31 determines whether or not the display part power source switch not shown in the drawing is operated by the user 100 to stop the display of the display image 200. When the CPU 31 determines that the display stopping operation by the user 100 is detected (step S135: Yes), the CPU 31 advances the processing to step S260 described later. On the other hand, when the CPU 31 determines that the display stopping operation is not detected (step S135: No), the CPU 31 advances the processing to step 140.

In step S140, the CPU 31 determines whether or not the display part power source switch (not shown in the drawing) for outputting an image to the display part 1 is turned on. That is, at this stage, although the inputting of the image from the PC is started, the stopping of displaying the image is not determined in fatigue determination processing in step S230 described later. Accordingly, the CPU 31 determines whether or not a switch for outputting the inputted image (display image 200) to the display part 1 is operated.

In step S130, when the CPU 31 determines that the display of the display image (display image 200) is being stopped (step S130: Yes), the CPU 31 advances the processing to step S300.

Figure 14A:
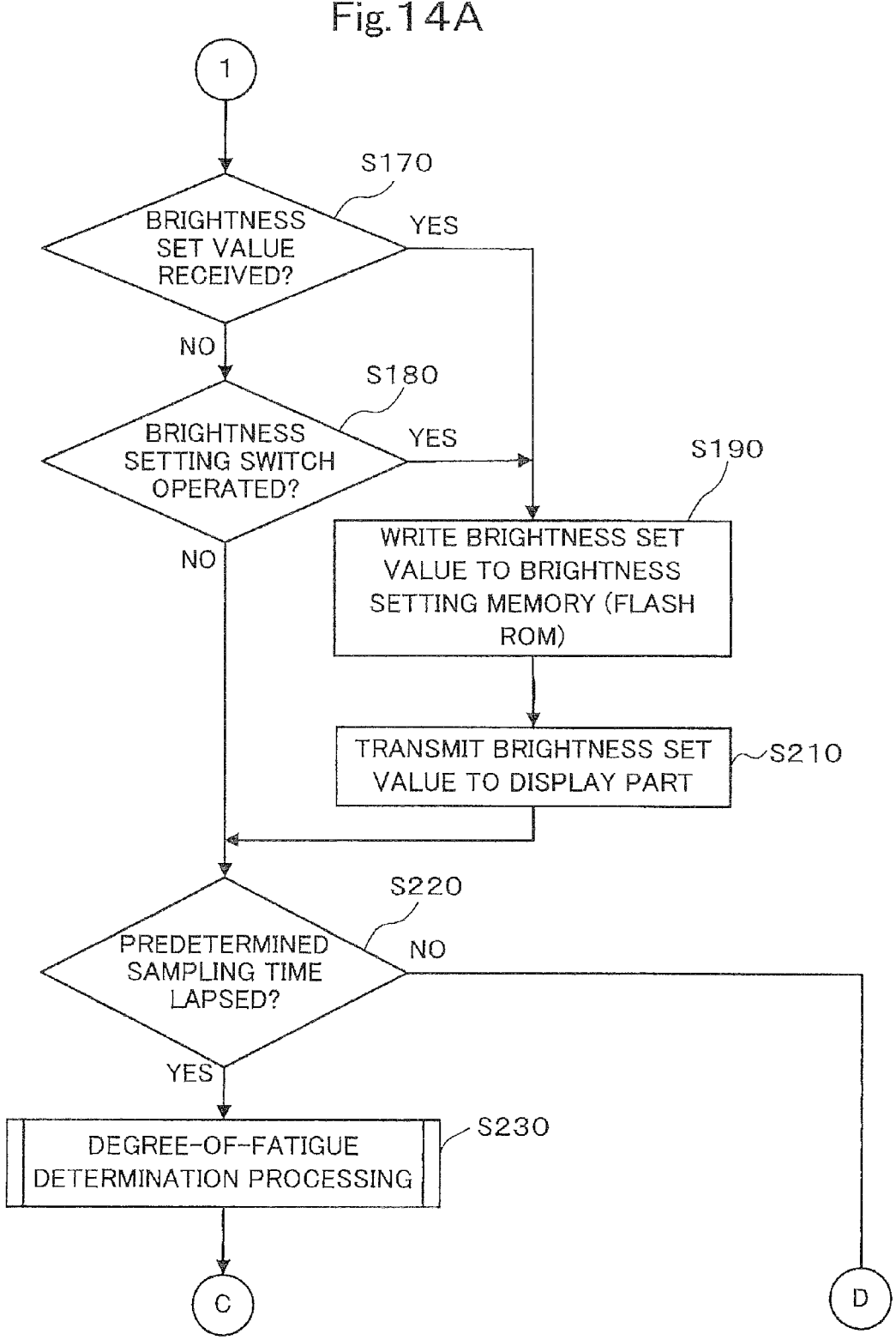
FIG. 14A is a flowchart showing the main processing of the HMD according to one embodiment of the present invention.

As shown in FIG. 14A, in step S140, when the CPU 31 determines that the image (display image 200) is not outputted to display part 1 (step S140: No), the CPU 31 advances the processing to step S170. On the other hand, when the CPU 31 determines that the image (display image 200) is outputted to the display part 1 (step S140: Yes), the CPU 31 turns on the display part power source (step S145) and outputs the inputted image (display image 200) to the display part 1 (step S150).

Next, the CPU 31 transmits a set value of the brightness (luminance) to the display part 1 (step S160) and, thereafter, advances the processing to step S170. The set value of the brightness (luminance) transmitted in step S160 is a predetermined default value.

In step S170, the CPU 31 determines whether or not the set value of the brightness is received from the PC 300. When the CPU 31 determines that the set value of the brightness is received (step S170: Yes), the CPU 31 advances the processing to step S190. On the other hand, when the CPU 31 determines that the set value of the brightness is not received (step S170: No), the CPU 31 determines whether or not the brightness (luminance) setting switch 15 is operated (step S180).

When the CPU 31 determines that the brightness setting switch 15 is operated (step S180: Yes), the CPU 31 advances the processing to step S190. On the other hand, when the CPU 31 determines that the brightness setting switch 15 is not operated (step S180: No), the CPU 31 advances the processing to step S220.

In step S190, the CPU 31 writes the brightness set value in the flash ROM 33 which is defined as a brightness setting memory. The CPU 31 transmits the brightness set value written in the flash ROM 33 to the display part 1 (step S210). Thereafter, the CPU 31 advances the processing to step S220.

In step S220, the CPU 31 determines whether or not a time for sampling the brightness of the display image 200 and the brightness of the ambient light elapses. This sampling time is set to 1 minute, for example. When the CPU 31 determines that the sampling time does not elapse (step S220: No), the CPU 31 returns the processing to step S130 and repeats the processing described heretofore. On the other hand, when the CPU 31 determines that the sampling time elapses for 1 minute (step S220: Yes), the CPU 31 executes the degree-of-fatigue determination processing (step S230).

Figure 15:
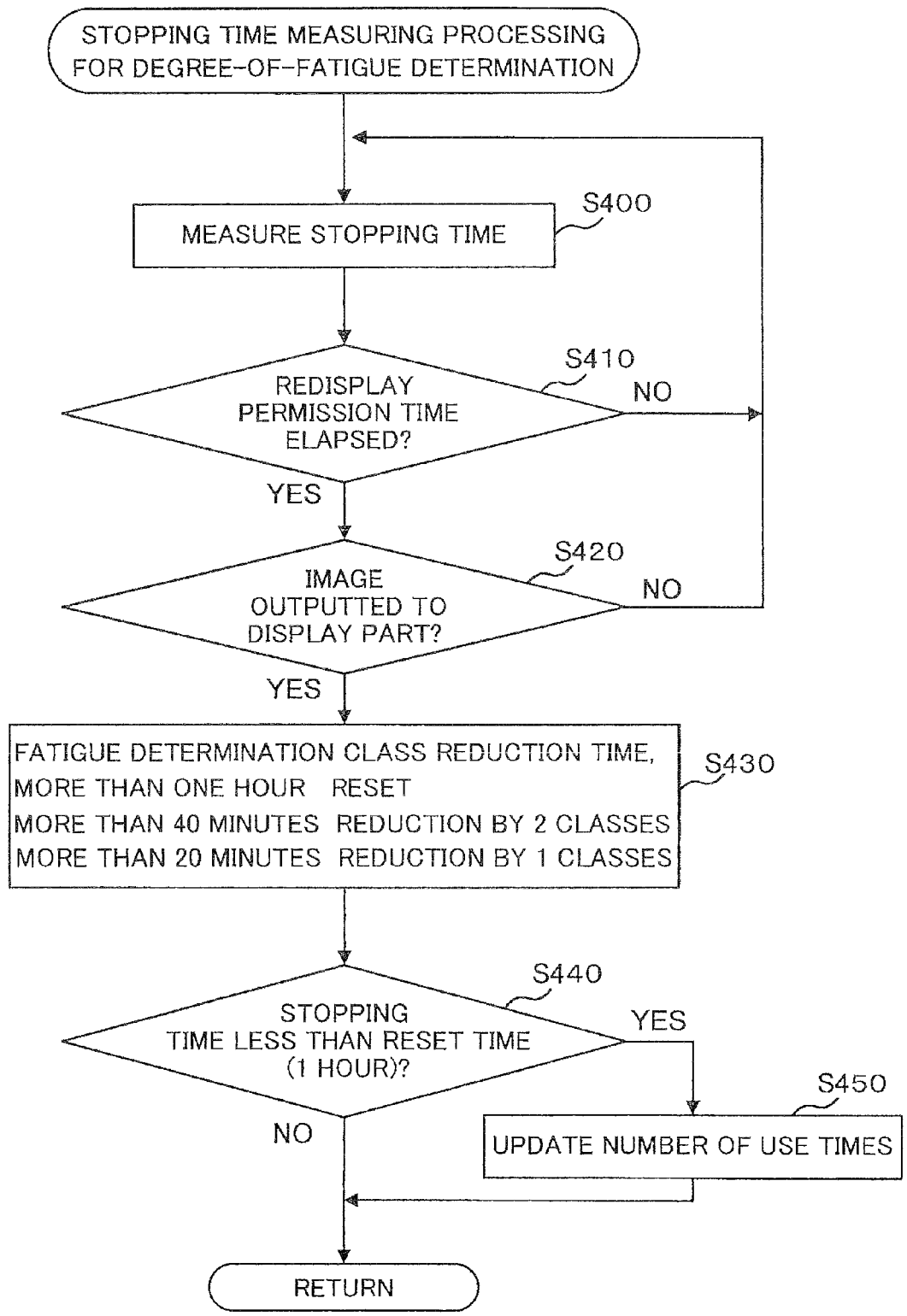
FIG. 15 is a flowchart showing a subroutine of processing which is executed in the main processing.

Before explaining the degree-of-fatigue determination processing, step S300 (stopping time measuring processing for fatigue determination) is explained in conjunction with FIG. 15. The processing in step S300 is processing executed in step S130 and is executed when the display of the display image (display image 200) is stopped for reducing fatigue of the user 100 (step S130: Yes). To facilitate the understanding of explanation, assume that the following processing from step S400 to step S450 are processing when the user 100 uses the display part 1 four times while stopping the use of the display part 1 for less than 20 minutes.

As shown in FIG. 15, in the stopping time measuring processing for fatigue determination, the CPU 31 firstly measures a time for stopping display of the image (display image 200) by the display part 1 (step S400). Next, the CPU 31 determines whether or not the stopping time exceeds a redisplay permission time when the display part power source is automatically turned off by the processing in step S270 described later (step S410). The redisplay permission time is set to 15 minutes, for example. When the CPU 31 determines that the image display is stopped due to the image stopping operation by the user 100, the CPU 31 skips the determination in step S410. When the CPU 31 determines that the redisplay permission time elapses (step S410: Yes), the CPU 31 determines whether or not the user 100 turns on the display part power source switch, that is, whether or not an image is to be outputted to the display part 1 (step S420).

When the CPU 31 determines that the stopping time does not exceed the redisplay permission time (step S410: No), or when the CPU 31 determines that the image is not outputted to the display part 1 (step S420: No), the CPU 31 continues the stopping time measuring processing in step S400.

Then, the CPU 31, in the processing in step S430, executes updating processing of the fatigue determination classes based on the result of measurement of the stopping time. That is, the CPU 31, when the stopping time is more than 20 minutes, for example, assumes that the user 100 can give his eye 101 a rest and increases the threshold values by reducing ranks of the fatigue determination classes corresponding to the stopping time.

In this embodiment, the control part 30 drops the rank by one class when more than 20 minutes elapse, drops the rank by two classes when more than 40 minutes elapse, and resets the rank when more than 60 minutes elapse. Here, resetting implies the processing for returning the fatigue determination classes to that of the number of use times of "1" irrespective of the number of continuous use times.

Here explained is the processing where the display of the image is stopped from the state where the use of the display part 1 is made 4 times with the short stopping of less than 20 minutes between the respective uses of the display part 1. When the stopping time is more than 20 minutes and less than 40 minutes, the control part 30 reduces the fatigue determination class by 1 rank. That is, the continuous use of the display part 1 is made 4 times at this point of time and hence, as shown in FIG. 12A to FIG. 12C, the number of continuous use times and the fatigue determination class are defined by N=4. Accordingly, the control part 30 defines the fatigue determination class as N=3 by reducing 1 rank. When the number of continuous use times is counted as the number of usual continuous use times, the number of use times becomes 5 and hence, the fatigue determination class is defined as N=5 whereby the threshold value becomes "100". Accordingly, the use time of the display part 1 is largely shortened thus giving a disadvantage to the user. However, by providing the proper rest (display stopping time), even when the number of use times is updated by the succeeding processing (step S440), the fatigue determination class is set to N=4 and hence, such a disadvantage can be obviated.

Further, when the stopping time is more than 40 minutes, the control part 30 reduces the fatigue determination class by 2 ranks. That is, the control part 30 redefines the stage where the number of continuous use times and the fatigue determination class are set to N=4 to the stage where the fatigue determination class is defined as N=2 by reducing the fatigue determination class by 2 ranks. Also in this case, when the number of continuous use times is counted as the number of usual continuous use times, the fatigue determination class is defined as N=5 and hence, the threshold value becomes "100" whereby the use time of the display part 1 is largely shortened thus giving a disadvantage to the user. However, by giving a considerable amount of rest (display stopping) time to the user, not only such a disadvantage can be obviated but also the fatigue determination class is reduced by 2 ranks than the present fatigue determination class so that the fatigue determination class becomes N=3 eventually even when the number of use times is updated whereby the threshold value becomes "100" which is defined by N=3. Accordingly, the use time of the display part 1 is prolonged compared to the use time of the display part 1 allocated when the threshold value defined by the present N=4 is "150".

Further, when the stopping time is more than 1 hour (60 minutes), the control part 30 resets the fatigue determination class. That is, the control part 30 redefines the stage where the number of continuous use times and the fatigue determination class are set to N=4 to the stage where the fatigue determination class is defined as N=1. In this manner, when a rest (display stopping) time of more than 1 hour is given, such a time is sufficient for recovering fatigue of the eye 101 of the user 100 and hence, the user 100 can use the HMD under the same condition as the case where the user uses the display part 1 first time.

In this manner, according to this embodiment, even when the number of continuous use times is increased, provided that the proper rest (display stopping) time is given to the user 100 in the continuous use of the display part 1, the limitation imparted to the use time of the display part 1 is largely alleviated and hence, there is no possibility that the user friendliness of the HMD is excessively damaged due to an excessive emphasis on health.

Next, the CPU 31 determines whether or not the stopping time is less than reset time (one hour) (step S440). When the CPU 31 determines that the stopping time is less than the reset time (one hour), that is, as long as the reset operation is not performed, the CPU 31 stores a value obtained by adding "1" to the present number of use times stored in the RAM 34 as the new number of use times of the display part 1 in the RAM 34 so as to update the number of use times of the display part 1 (step S450).

When the stopping time measuring processing for fatigue determination is finished, the CPU 31 returns the processing to the main flow shown in FIG. 13A and sets the flag to an OFF state indicative of stopping of displaying of an image in step S330. Thereafter, the CPU 31 executes the processing of the above-mentioned step S145 to step S220.

Figure 16:
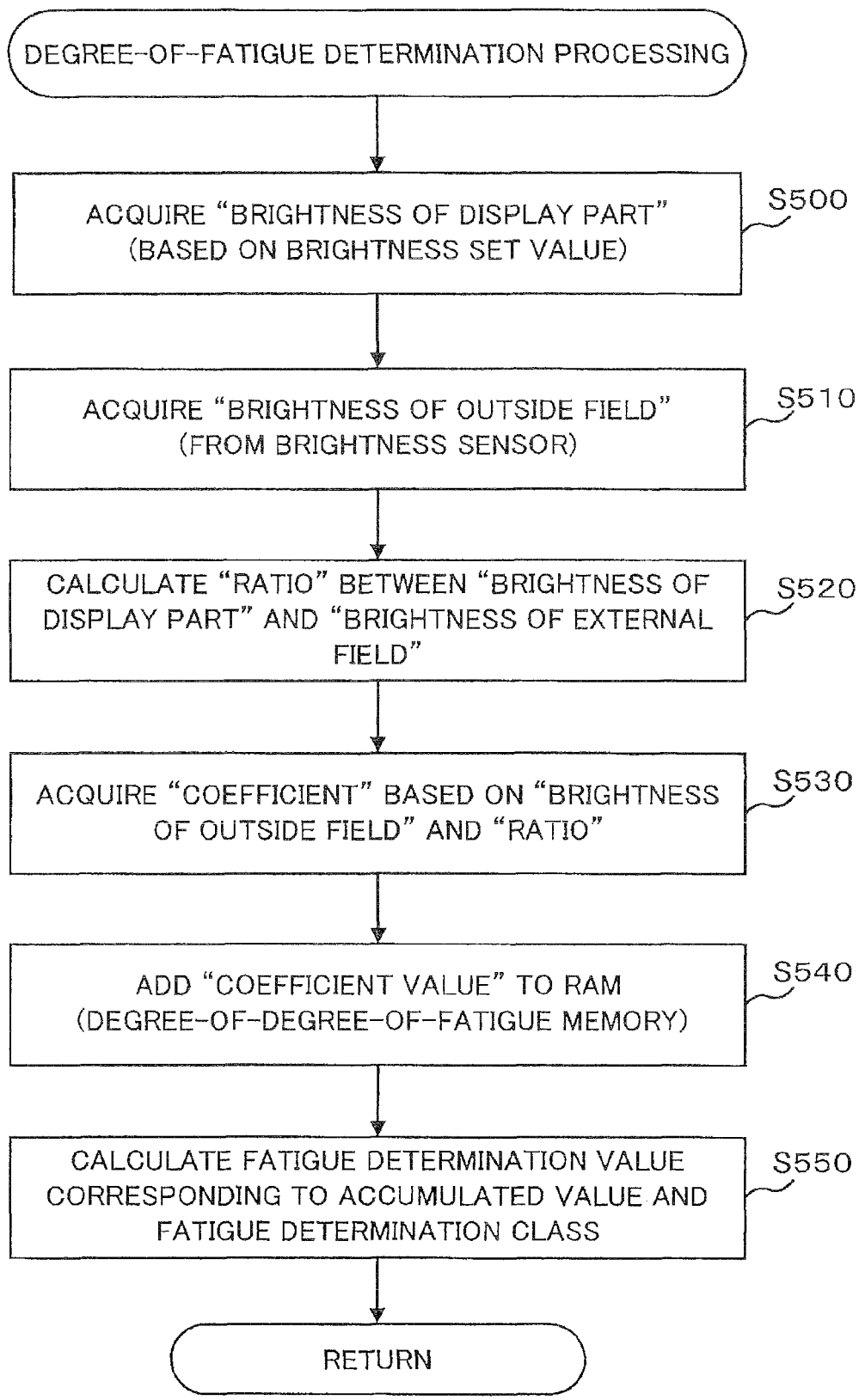
FIG. 16 is a flowchart showing a subroutine of processing which is executed in the main processing.

Here, the degree-of-fatigue determination processing in step S230 executed at intervals of one minute is explained in conjunction with FIG. 16. As shown in the drawing, in the degree-of-fatigue determination processing, firstly, the CPU 31 obtains a set value of the brightness (luminance) of the display image 200 displayed by the display part 1 (step S500). The brightness is usually the brightness set by operating the brightness setting switch 15.

Next, the CPU 31 obtains the brightness of the ambient light detected by the brightness sensor 2 (step S510). The processing in step S500 and the processing in step S510 may be executed in the order opposite to the above-mentioned order.

Next, when the brightness of the ambient light is expressed by illuminance (unit: lux (lx)), the CPU 31 converts illuminance into luminous intensity and calculates a ratio between the brightness of the display image 200 and the brightness of the ambient light (step S520).

Next, the CPU 31 looks up the fatigue determination table (FIG. 12) stored in the flash ROM 33 and obtains a coefficient corresponding to the ratio between the brightness of the ambient light and the brightness of the display part 1 (coefficient being set to 5, 7 or 9) (step S530). The CPU 31 adds the obtained coefficient value to an accumulated value up to this time stored in the RAM 34 which functions as a degree-of-fatigue memory (step S540).

Next, the CPU 31, based on the number of continuous use times (fatigue determination class) and the accumulated value of coefficient stored in the RAM 34 in step S150, looks up the fatigue determination table (FIG. 12) and, as described previously, calculates a fatigue determination value based on a ratio with the threshold value (step S550).

Figure 14B:
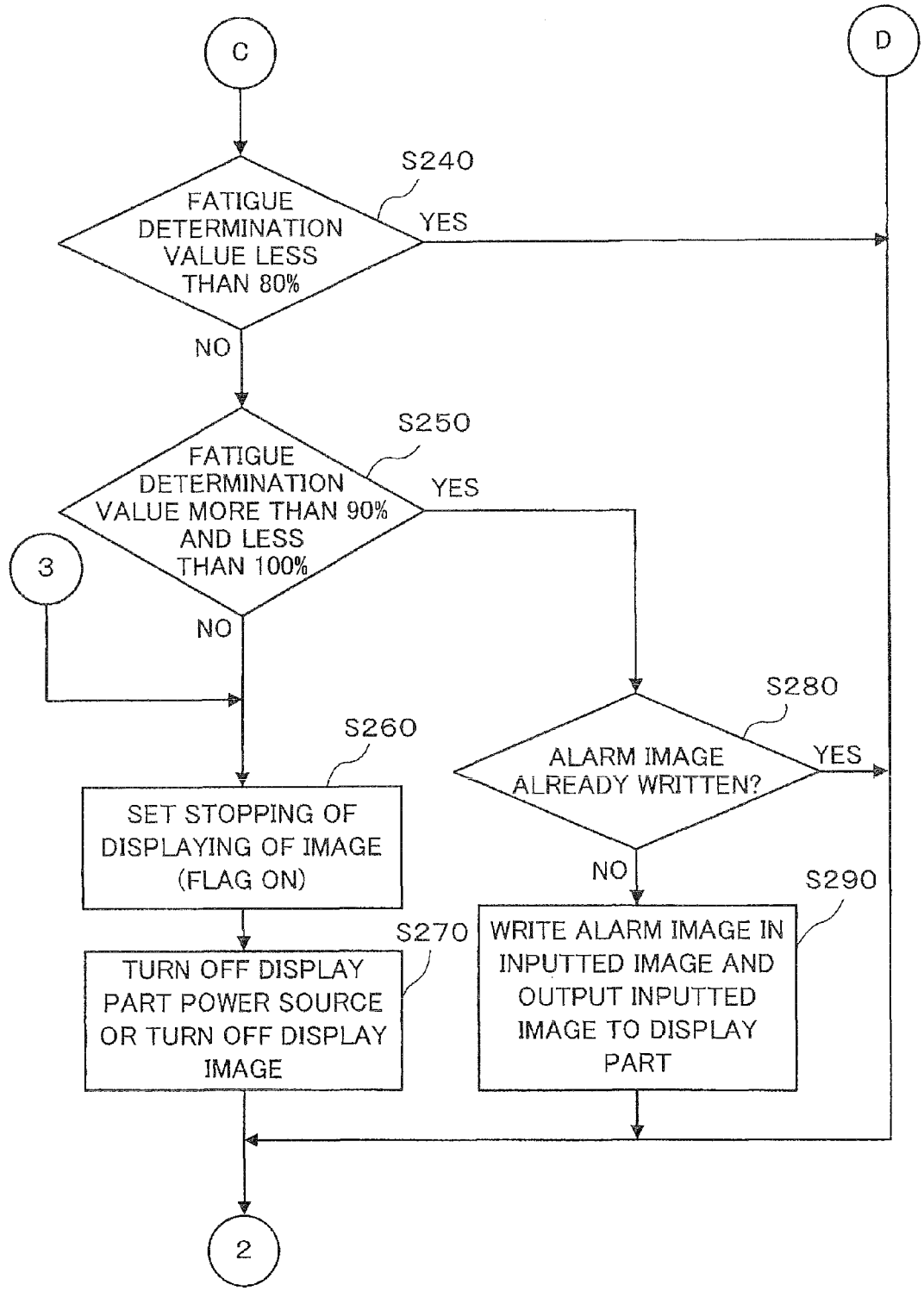
FIG. 14B is a flowchart showing the main processing of the HMD according to one embodiment of the present invention.

When degree-of-fatigue determination processing is finished, as shown in FIG. 14B, as a next step, the CPU 31 determines whether or not the fatigue determination value is less than 80% (step S240). When the CPU 31 determines that the fatigue determination value is less than 80% (step S240: Yes), the CPU 31 determines that the user 100 has not felt fatigue yet and returns the processing to step S130. On the other hand, when the CPU 31 determines that the fatigue determination value is not less than 80% (step S240: No), the CPU 31 advances the processing to step S250. In step S250, this time, the CPU 31 determines whether or not the fatigue determination value is more than 90% and less than 100%.

When the CPU 31 determines that the fatigue determination value is more than 90% and less than 100% (step S250: Yes), the CPU 31 advances the processing to step S280. In step S280, the CPU 31 determines whether or not the alarm image 250 (see FIG. 5A, FIG. 5B) is already written in the display image 200 which is displayed by the display part 1. When the CPU 31 determines that the alarm image 250 is already written in the display image 200 (step S280: Yes), the CPU 31 directly returns the processing to step S130. On the other hand, when the CPU 31 determines that the alarm image 250 is not yet written in the display image 200 (step S280: No), the CPU 31 advances the processing to step S290. In step S290, the CPU 31 executes processing which writes the alarm image 250 into the input image (display image 200) and outputs the input image to the display part 1 and, thereafter, returns the processing to step S130.

As the processing which outputs the alarm image 250 to the display part 1 in step S290, the CPU 31 may allow the user to visually recognize the alarm image 250 by generating an image light corresponding to the alarm image 250 supplied from the PC 300 in the light source unit 1b and by projecting the image light to the eye 101 of the user 100 from the projection unit 1a.

Further, in step S250, when the CPU 31 determines that the fatigue determination value is more than 90% and not less than 100%, that is, 100% or more (step S250: No), the CPU 31 advances the processing to step S260. In step S260, the CPU 31 stores a flag for stopping the display image in the RAM 34, and sets a state where the display image (display image 200) is stopped. The CPU 31 determines whether or not the display image is stopped based on this flag in the above-mentioned step S130.

After the processing in step S260 is finished, in executing the processing in step S270, the CPU 31 forcibly prevents the user 100 from visually recognizing the display image 200 by turning off the power source of the display part 1 or by stopping the outputting of the image light from the light source unit 1b, and the CPU 31 returns the processing to step S130.

In this manner, in the HMD according to this embodiment, when the user 100 uses the display part 1, the proper use time is automatically set corresponding to the difference between the brightness of the ambient light and the brightness of the display image 200 and hence, it is possible to restrict the continuous use of the display part 1 by the user 100. Accordingly, it is possible to prevent the user 100 who is liable to excessively use his eye 101 from feeling eyestrain. Furthermore, in the HMD according to this embodiment, the timing where the stopping of use is notified is changed also corresponding to the time during which the user 100 continuously uses the display part 1 and hence, it is possible to realize the reduction of eyestrain of the user more effectively.

Another embodiment of degree-of-fatigue determination processing executed in step S230 (see FIG. 16) is explained. In this embodiment, the CPU 31 obtains the brightness of the display part 1 not based on the set value set by the brightness setting switch 15 but based on values of the brightnesses of pixels of the display image 200. Further, in place of the processing in step S500 shown in FIG. 16, processing in step S501 to step S504 explained hereinafter are executed.

Figure 17:
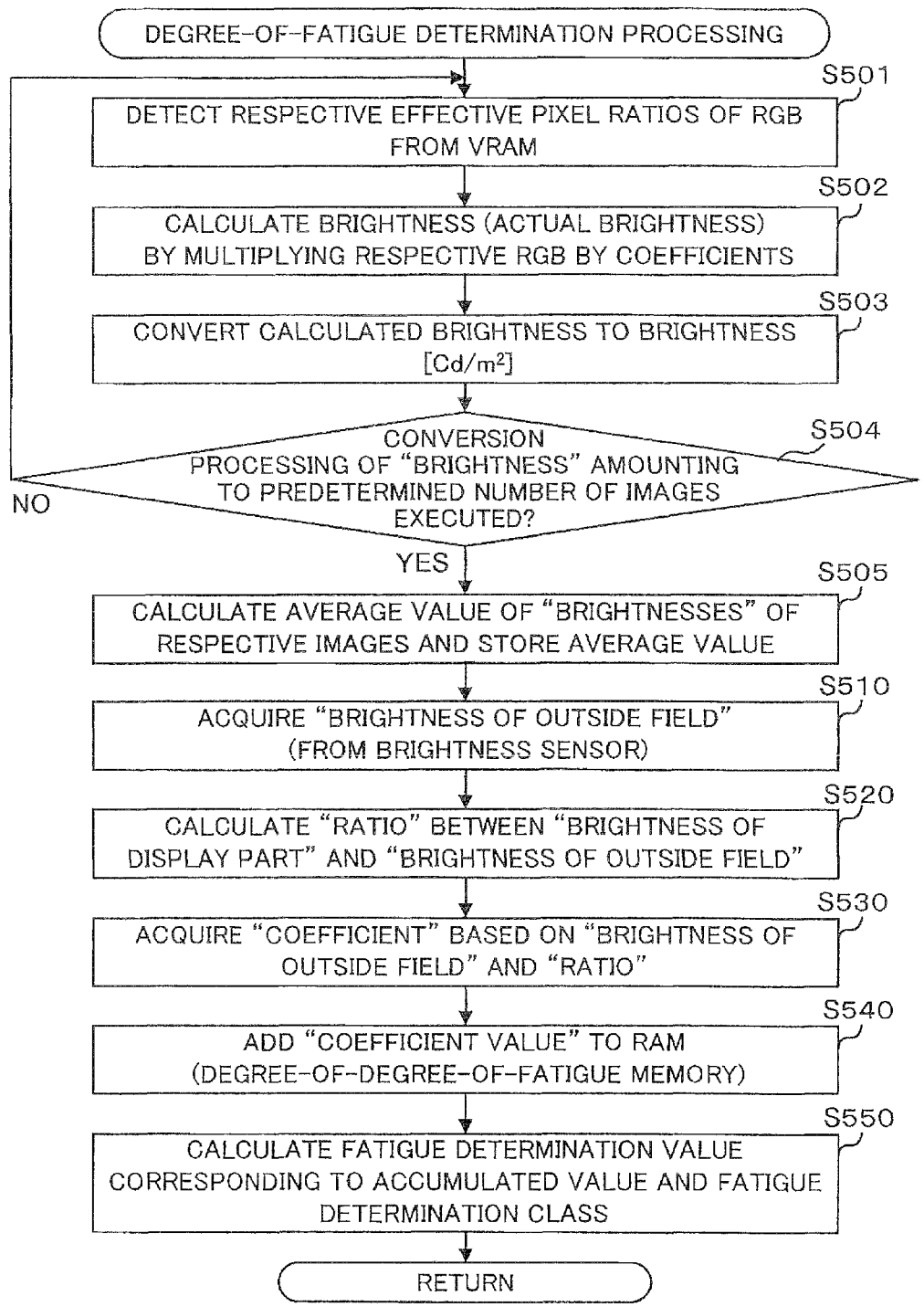
FIG. 17 is a flowchart of degree-of-fatigue determination processing according to a modification.

That is, as shown in FIG. 17, the CPU 31, firstly, detects respective effective pixel ratios of R (red), G (green) and B (blue) from the display-use VRAM 37 (step S501). That is, the brightness of each pixel is decided based on an ON/OFF state and a duty (time) when the pixel is in an ON state. As a matter of course, when the duty is 100%, the brightness takes the maximum value. Due to such an operation, duties of pixels in an ON state are accumulated for respective R, G, B and, then, accumulated values are divided by the total pixel number thus detecting the respective effective pixel ratios.

Next, the CPU 31 calculates the substantial brightnesses by multiplying the respective effective pixel ratios of RGB by predetermined coefficients (step S502).

Here, the coefficients by which the respective effective pixel ratios of RGB are multiplied are 0.2 in case of R (red), 1 in case of G (green), and 0.1 in case of B (blue). These coefficients are based on the luminosity function, and light having a wavelength of 555 nm (nanometer) by which a human eye feels the largest intensity, that is, G (green) which is close to such light is set to 1. Further, in this embodiment, the maximum brightness of the display part 1 is set to 800 (cd/m$^2$). The substantial brightnesses of the respective RGB are obtained based on the maximum brightness and the effective pixel ratios of the R, G, B to which the respective coefficients are multiplied. For stricter calculation, a diameter of the pupil of the eye 101 is detected and the diameter may be multiplied by the respective effective pixel ratios.

Next, the CPU 31 converts the calculated value into intensity of light (candela (cd/m$^2$)) necessary for processing executed later (step S503).

The CPU 31 executes the brightness conversion processing only for the number of times equal to the predetermined number of images (step S504). That is, the CPU 31 repeats the processing in step S501 to step S503 only for the number of times equal to the predetermined number of images. Next, the CPU 31 obtains an average value of the brightnesses obtained for respective images and stores the average value of the brightnesses (step S505).

Thereafter, the CPU 31 performs the same processing as the processing in step S510 to step S550 shown in FIG. 16, and advances the processing to step S240 of the main processing (see FIG. 14B).

According to this processing, the CPU 31 obtains the average value of the brightnesses of pixels of the display image 200 by calculation based on data on the display image 200 stored in the display-part-use VRAM 37, and sets such brightness as the brightness of the display image 200. Accordingly, the CPU 31 can acquire the actual brightness of the display image 200 more accurately. The CPU 31 also can accurately detect the difference between the brightness of the ambient light 400 and the brightness of the display image 200.

Figure 18:
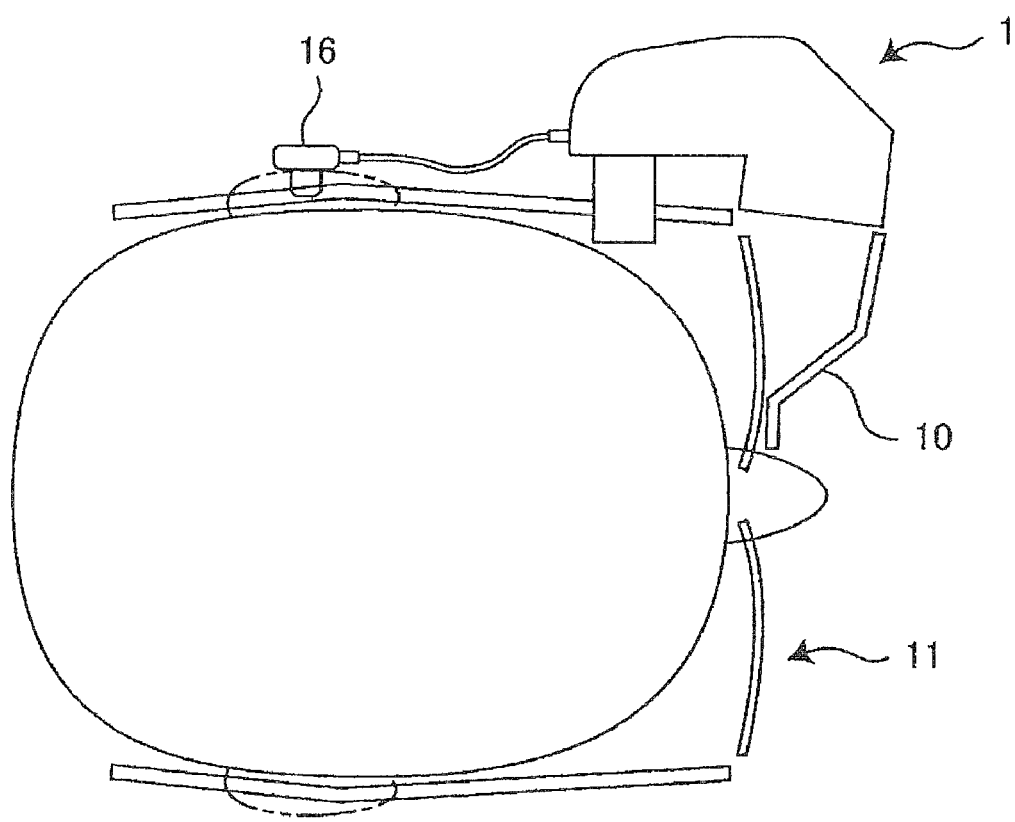
FIG. 18 is an explanatory view of an HMD which includes an earphone.

In the above-mentioned embodiment, the HMD prompts the user 100 to stop the use of the display part 1 using the alarm image 250. However, the HMD may prompt the user to stop the use of the display part 1 using a voice, for example. As shown in FIG. 18, using the HMD having an earphone 16 which outputs a voice, it is possible to output a voice which prompts the user 100 to stop the use of the display part 1 from the earphone 16. Accordingly, the HMD can strongly prompt the user 100 to stop the use of the display part 1. As a matter of course, in the HMD having the earphone 16, the HMD may prompt the user 100 to stop the use of the display part 1 using a voice and the alarm image 250 simultaneously.

As has been explained heretofore, according to this embodiment, the following advantageous effects can be expected.

(1) The HMD includes the display part 1 (the projection unit 1a and the light source unit 1b) which allows the user 100 to visually recognize the display image 200 by projecting the image light 500 corresponding to the display image 200 on the eye. 101 of the user 100 in a state where some ambient light 400 reaches at least either one of eyes 101 of the user 100. Further, the HMD determines the brightness of the ambient light 400 which is measured by the brightness sensor 2 and the brightness of the display image 200, and detects the difference between the brightness of the ambient light 400 and the brightness of the display image 200. The HMD decides stop timing where the use of the display part 1 by the user 100 is temporarily stopped based on a detection result of the detection unit after the use of the display part 1 is started by the user 100. The HMD includes the control part 30 (the determination unit, the detection unit, the decision unit and the notification processing unit) which performs stopping-of-use notification which prompts the user 100 to stop the use of the display part 1 at the decided stop timing. Wherever the HMD which exhibits relatively high degree of freedom in use-environment is used, it is possible to perform stopping-of-use notification which prompts the user 100 to stop the use of the display part 1 at a proper time corresponding to various environments where the HMD is used. Due to such a constitution, in the HMD, it is possible to prevent eyestrain which the user 100 feels by using the HMD from adversely affecting a health of the user 100 as much as possible. Accordingly, it is possible to prevent a case where the stopping of use is notified in spite of a fact that the user 100 does not feel fatigue in his eyes 101 and the user 100 feels cumbersome in his eye or a case where the user feels eyestrain before a predetermined time set for notifying the stopping of use still does not elapse as much as possible.

(2) In the HMD, the control part 30 which plays the function of the decision unit accumulates the coefficient value allocated corresponding to the detection result for every unit time, and decides the timing where the accumulated value becomes the predetermined threshold value or more as stop timing. Due to such a constitution, in the HMD, by following the stopping of use notified at the proper time corresponding to the use environment, the user 100 can use the display part 1 without worrying about eyestrain or the like.

(3) Further, the control part 30 which plays the function of the decision unit can change the coefficient value allocated corresponding to the detection result corresponding to the brightness of the ambient light. Due to such a constitution, in the HMD, it is possible to decide the time corresponding to the use environment more accurately.

(4) Further, the HMD includes the flash memory (memory part) such as the flash ROM 33 which stores the fatigue determination table in which the coefficient value which is allocated corresponding to the result detected by the control part 30 which plays the function of the detection unit is set corresponding to the brightness of the ambient light. The control part 30 (decision unit) decides the coefficient value allocated corresponding to the detection result of the control part 30 (decision unit) based on the fatigue determination table stored in the memory part. Due to such a constitution, for example, in the HMD, processing for deciding a coefficient value for every minute or every second is facilitated thus also reducing a burden on the CPU 31.

(5) The control part 30 plays a function of the count unit which counts the number of times that the display part 1 is used by the user 100, and a value corresponding to a result of counting by the count unit is set as the predetermined threshold value. Due to such a constitution, when the user 100 continuously uses the display part 1, the HMD can differ notification timing of stopping of use corresponding to the number of times that the display part 1 is used. Accordingly, it is possible to more effectively realize the reduction of eyestrain which the user feels.

(6) Further, the control part 30 functions as the time measuring unit which measures time during which the use of the display part 1 by the user 100 is stopped. The control part 30 corrects the result of counting on the number of times that the display part 1 is used based on a time measurement result of the time measuring unit and sets a coefficient value corresponding to the correction result as the predetermined threshold value. For example, when it is estimated that the user acquires the sufficient relaxation of his eyes 101 based on the result of counting, in the use of the display part 1 next time, the HMD delays timing for notifying the necessity of stopping of use thus setting a use time of the display part 1 longer than before. Accordingly, the user-friendliness of the HMD is not damaged.

(7) Further, the control part 30 can calculate an average value of the brightnesses of pixels of the display image based on data of the display image 200 and sets the calculated average value as the brightness of the display image 200. Due to such a constitution, it is possible to more accurately acquire the brightness of an actual display image 200. Further, it is also possible to accurately detect the difference between the brightness of the ambient light 400 and the brightness of the display image 200.

(8) Further, the HMD includes the brightness setting switch 15 (adjustment part) which adjusts a predetermined value of the brightness of the display image 200 displayed by the display part 1. The control part 30 (detection unit) detects the set value adjusted by the brightness setting switch 15 and sets the predetermined value as the brightness of the display image 200. Due to such a constitution, the HMD can more easily detect the difference between the brightness of the ambient light 400 and the brightness of the display image 200.

(9) Further, the control part 30 (notification processing unit) can project an image light corresponding to the alarm image 250 which prompts the user 100 to stop the use of the display part 1 on an eye of the user 100 from the display part 1. In the HMD, it is possible to make the user 100 recognize the alarm image 250 by a usual display method.

(10) The HMD includes the earphone which outputs a voice. The control part 30 (notification processing unit) can be configured also to output a voice which prompts the user 100 to stop the use of the display part 1 from the earphone 16. Due to such a constitution, the HMD can strongly prompt the user 100 to stop the use of the display part 1.

Although the present invention has been explained heretofore in conjunction with the embodiments, in acquiring the brightness of the display image 200, the brightness sensors which detect a change of the brightnesses of laser beams which the lasers 63, 64, 65 (see FIG. 8) output, for example, may be provided, and the brightness may be detected using these brightness sensors.

Further, the present invention has been explained with respect to the case where the projection unit 1*a* and the light source unit 1*b* form separate bodies from each other as the display part 1. However, the projection unit 1*a* and the light source unit 1*b* may be integrally formed. Further, the retinal scanning display is adopted as the HMD in the above-mentioned embodiment. However, it is possible to use a display of a type in which an image light which is formed by transmission or reflection of light through or on a LCD (Liquid Crystal Display) is projected on the eye 101 of the user 100 thus allowing the user 100 to visually recognize the display image 200. Here, the LCD, a light source and the like are incorporated in the display part 1, an image is displayed on the LCD in response to image signals outputted from a predetermined image forming part, light from the light source is incident on the LCD, and is allowed to transmit or to be reflected on the LCD thus forming the image light.

What is claimed is:

1. An image display device comprising:
   a display part which is configured to allow a user to visually recognize a display image by projecting an image light corresponding to the display image onto an eye of the user in a state where at least some ambient light reaches at least either one of eyes of the user;
   a measuring instrument which is configured to measure a brightness of the ambient light;
   a determination unit which is configured to determine a brightness of the display image;
   a detection unit which is configured to detect a difference between the brightness of the ambient light and the brightness of the display image;
   a decision unit which is configured to decide a stop timing where a use of the display part by the user is temporarily stopped based on a detection result of the detection unit after the use of the display part is started by the user; and
   a notification processing unit which is configured to perform a stopping-of-use notification which visually prompts the user to stop the use of the display part at the stop timing decided by the decision unit,
   wherein the decision unit is configured to accumulate, for every unit time, an allocated value allocated corresponding to the detection result of the detection unit, and is configured to decide a timing where the accumulated allocated value becomes a predetermined threshold value or more as the stop timing.

2. An image display device according to claim 1, wherein the decision unit is configured to change the allocated value corresponding to the brightness of the ambient light.

3. An image display device according to claim 2, further comprising a memory part which is configured to store a table in which the allocated value which is allocated corresponding to the detection result of the detection unit is set corresponding to the brightness of the ambient light, wherein
   the decision unit is configured to decide the allocated value based on the table stored in the memory part.

4. An image display device according to claim 1, further comprising a count unit which is configured to count a number of times that the display part is used by the user, wherein
   the decision unit is configured to set a value corresponding to a result of counting by the count unit as the predetermined threshold value.

5. An image display device according to claim 4, further comprising a time measuring unit which is configured to measure a time during which the use of the display part by the user is stopped, wherein
   the decision unit is configured to correct the result of counting by the count unit based on a time measurement result by the time measuring unit, and to set a value corresponding to the result of counting corrected by the decision unit as the predetermined threshold value.

6. An image display device according to claim 1, wherein the detection unit is configured to obtain an average value of the brightnesses of pixels of the display image based on data of the display image and to set the average value as the brightness of the display image.

7. An image display device according to claim 1, further comprising an adjustment part which is configured to adjust a set value of the brightness of the display image displayed by the display part, wherein
   the detection unit is configured to detect the set value adjusted by the adjustment part and to set the set value as the brightness of the display image.

8. An image display device according to claim 1, wherein the notification processing unit is configured to project an image light corresponding to an image which prompts the user to stop the use of the display part to the eye of the user.

9. An image display device according to claim 1, further comprising an earphone which outputs a voice, wherein the notification processing unit is configured to output a voice which prompts the user to stop the use of the display part from the earphone.

10. An image display device according to claim 1, further comprising a mounting portion which is configured to mount the display part on a head of the user.

* * * * *